(12) United States Patent
Yeon et al.

(10) Patent No.: US 8,391,394 B2
(45) Date of Patent: Mar. 5, 2013

(54) COMMUNICATION METHOD AND APPARATUS USING CODEBOOK IN MIMO SYSTEM

(75) Inventors: Myung Hoon Yeon, Yongin-si (KR); Joon Young Cho, Suwon-si (KR); Ju Ho Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 204 days.

(21) Appl. No.: 12/819,744

(22) Filed: Jun. 21, 2010

(65) Prior Publication Data
US 2010/0322343 A1 Dec. 23, 2010

(30) Foreign Application Priority Data

| Jun. 19, 2009 | (KR) | .................. | 10-2009-0055160 |
| Jul. 4, 2009 | (KR) | .................. | 10-2009-0060919 |
| Aug. 18, 2009 | (KR) | .................. | 10-2009-0076425 |
| Oct. 5, 2009 | (KR) | .................. | 10-2009-0094390 |
| Oct. 30, 2009 | (KR) | .................. | 10-2009-0104237 |
| Jan. 21, 2010 | (KR) | .................. | 10-2010-0005781 |
| Feb. 1, 2010 | (KR) | .................. | 10-2010-0008906 |

(51) Int. Cl.
*H04B 7/02* (2006.01)
*H04L 1/02* (2006.01)

(52) U.S. Cl. ...................... 375/267; 375/260; 375/347

(58) Field of Classification Search ............... 375/260, 375/267, 299, 347
See application file for complete search history.

(56) References Cited

U.S. PATENT DOCUMENTS

2010/0039928 A1* 2/2010 Noh et al. ................. 370/210
2010/0215110 A1* 8/2010 Onggosanusi et al. ....... 375/260

FOREIGN PATENT DOCUMENTS

| KR | 1020090054357 | 5/2009 |
| WO | WO 2008/058112 | 5/2008 |
| WO | WO 2009/064108 | 5/2009 |

* cited by examiner

*Primary Examiner* — Curtis Odom
(74) *Attorney, Agent, or Firm* — The Farrell Law Firm, P.C.

(57) ABSTRACT

A method and apparatus for transmitting and receiving signals using a codebook which maps each codeword to at least two different antennas is provided for a MIMO system. A transmission method includes mapping multiple codewords to multiple layers; mapping the multiple layers to multiple antennas using a precoding matrix selected from a rank-3 codebook which is designed to map the codewords to different antennas; and transmitting the codewords through paths formed by mapping the layers and the antennas. The precoding matrix of the rank-3 codebook is designed to equalize transmit power ratios between the antennas. The communication method and apparatus is advantageous to solve the problem of transmit power imbalance among the layers and the problem of performance degradation at the high SNR region in the conventional system using the rank-3 precoding matrices.

4 Claims, 16 Drawing Sheets

COMMUNICATION METHOD AND APPARATUS USING CODEBOOK IN MIMO SYSTEM

PRIORITY

This application claims priority to applications filed with the Korean Intellectual Property Office on Jun. 19, 2009, Jul. 4, 2009, Aug. 18, 2009, Oct. 5, 2009, Oct. 30, 2009, Jan. 21, 2010 and Feb. 1, 2010 and assigned Serial Nos. 10-2009-0055160, 10-2009-0060919, 10-2009-0076425, 10-2009-0094390, 10-2009-0104237, 10-2010-0005781 and 10-2010-0008906, the contents of which are hereby incorporated by reference.

BACKGROUND OF THE INVENTION

1. Field of the Invention

The present invention relates to a Multiple Input Multiple Output (MIMO) system and, in particular, to a method and apparatus for transmitting and receiving signals using a codebook which maps each codeword to at least two different antennas in a MIMO system.

2. Description of the Related Art

Recently, extensive research has focused on Orthogonal Frequency Division Multiple Access (OFDMA) and Single Carrier-Frequency Division Multiple Access (SC-FDMA) to implement high speed data transmission on wireless channels in wireless communication system. In Long Term Evolution (LTE), as a next generation wireless communication standard, Orthogonal Frequency Division Multiplexing (OFDM) is adopted for downlink transmission, and the SC-FDMA is used for uplink transmission. In the OFDM system, due to its high Peak-to-Average Power Ratio (PAPR) it is required to increase the back-off of the input signal of the power amplifier in order to prevent non-linear distortion of the signal, thus limits the maximum transmission power, resulting in degradation of the power efficiency. The back-off is needed to limit the transmit power to the maximum value of a power amplifier so as to guarantee the linearity of the transmit signal. For example, assuming that a power amplifier has a maximum value of 23 dBm and the back-off is 3 dB, the maximum value of transmission power becomes 20 dBm. This does not cause a problem in OFDMA as the downlink multiplexing technique since the transmitter exists in the base station which is not limited in power. In a case where OFDMA is adopted as the uplink multiplexing, however, the transmitter of the power-constrained user equipment is limited in transmission power, resulting in a reduction of the base station coverage. As a result, SC-FDMA has been adopted by the $3^{rd}$ Generation Partnership Project (3GPP) for use in the LTE uplink as an alternative to OFDM.

Various wireless communication technologies have been developed for supporting diverse multimedia services in the recent wireless communication environment, in which a high data rate is required for providing high quality multimedia services. In order to meet the high data rate requirements, extensive research is being conducted, and MIMO is one of the underlying technologies for that purpose.

MIMO is the technology for expanding the channel capacity within the limited frequency resource by using multiple antennas. Using multiple antennas in a scattering environment, it is possible to secure the channel capacity logically in proportion to the number of the antennas. In order to improve the data transmission efficiency in a MIMO system, the MIMO system is required to encode data in advance. This process is referred to as precoding. The rule for precoding data is represented by a set of precoding matrices which is referred to as a codebook. In LTE-Advanced (LTE-A), the MIMO technology using precoding matrices is one of the proposed key technologies for performance improvement of uplink transmission in single-user and multi-user environments. The codebook-based precoding is being considered as a technology for simply improving the LTE system. Although the aforementioned SC-FDMA is adopted as a promising uplink technology thanks to its low PAPR over OFDM, SC-FDMA causes the following problems when combined with the precoding-based MIMO technology. If multiple antenna precoding matrices are applied to the SC-FDMA and if a precoding matrix mixing the data of different layers is selected, the PAPR increases at each antenna.

In the case of the SC-FDMA MIMO system using 4 transmit antennas and 4 receive antennas, a maximum of 4 ranks of data channels can be generated between the transmit and receive antennas, using different precoding matrices. For example, if it is determined that a rank-1 channel is established between the transmit and receive antennas, the precoding matrices as shown in Table 1 can be used.

Table 1 sets forth an exemplary rank-1 codebook of the precoding matrices for 4 transmit antennas.

TABLE 1

$$\begin{bmatrix}1\\0\\0\\0\end{bmatrix} \quad \begin{bmatrix}0\\1\\0\\0\end{bmatrix} \quad \begin{bmatrix}0\\0\\1\\0\end{bmatrix} \quad \begin{bmatrix}0\\0\\0\\1\end{bmatrix} \quad \frac{1}{2}\begin{bmatrix}1\\1\\1\\-j\end{bmatrix} \quad \frac{1}{2}\begin{bmatrix}1\\1\\j\\-1\end{bmatrix}$$

$$\frac{1}{2}\begin{bmatrix}1\\1\\-1\\j\end{bmatrix} \quad \frac{1}{2}\begin{bmatrix}1\\1\\-j\\1\end{bmatrix} \quad \frac{1}{2}\begin{bmatrix}1\\1\\-j\\-j\end{bmatrix} \quad \frac{1}{2}\begin{bmatrix}1\\j\\1\\-1\end{bmatrix} \quad \frac{1}{2}\begin{bmatrix}1\\j\\j\\j\end{bmatrix} \quad \frac{1}{2}\begin{bmatrix}1\\j\\j\\-1\end{bmatrix}$$

$$\frac{1}{2}\begin{bmatrix}1\\j\\-1\\-j\end{bmatrix} \quad \frac{1}{2}\begin{bmatrix}1\\j\\-j\\-1\end{bmatrix} \quad \frac{1}{2}\begin{bmatrix}1\\-1\\1\\j\end{bmatrix} \quad \frac{1}{2}\begin{bmatrix}1\\-1\\j\\1\end{bmatrix} \quad \frac{1}{2}\begin{bmatrix}1\\-1\\-1\\-j\end{bmatrix} \quad \frac{1}{2}\begin{bmatrix}1\\-1\\-1\\-1\end{bmatrix}$$

$$\frac{1}{2}\begin{bmatrix}1\\-1\\-j\\j\end{bmatrix} \quad \frac{1}{2}\begin{bmatrix}1\\-j\\1\\1\end{bmatrix} \quad \frac{1}{2}\begin{bmatrix}1\\-j\\1\\-j\end{bmatrix} \quad \frac{1}{2}\begin{bmatrix}1\\-j\\j\\-1\end{bmatrix} \quad \frac{1}{2}\begin{bmatrix}1\\-j\\-1\\j\end{bmatrix} \quad \frac{1}{2}\begin{bmatrix}1\\-j\\-j\\1\end{bmatrix}$$

In Table 1, each preceding matrix has 4 rows (i.e. four antennas) and 1 column (i.e. rank-1, i.e. one layer). In the rank-1 preceding matrix, the number of layers is 1 and thus the outputs of the individual antennas are not mixed. In this case, there is no increase in PAPR at the power amplifier of each antenna.

If it is determined that a rank-2 channel is established between the transmit and receive antennas, the precoding matrices as shown in Table 2 can be used.

Table 2 sets forth an exemplary rank-2 codebook of the precoding matrices for 4 transmit antennas.

TABLE 2

$$\frac{1}{2}\begin{bmatrix}1 & 0\\0 & 1\\-j & 0\\0 & 1\end{bmatrix} \quad \frac{1}{2}\begin{bmatrix}1 & 0\\0 & 1\\0 & j\\1 & 0\end{bmatrix} \quad \frac{1}{2}\begin{bmatrix}1 & 0\\1 & 0\\0 & 1\\0 & -1\end{bmatrix} \quad \frac{1}{2}\begin{bmatrix}1 & 0\\0 & 1\\-1 & 0\\0 & -j\end{bmatrix}$$

TABLE 2-continued $$\frac{1}{2}\begin{bmatrix} 1 & 0 \\ 0 & 1 \\ 1 & 0 \\ 0 & j \end{bmatrix} \quad \frac{1}{2}\begin{bmatrix} 1 & 0 \\ 1 & 0 \\ 0 & 1 \\ 0 & 1 \end{bmatrix} \quad \frac{1}{2}\begin{bmatrix} 0 & 1 \\ 0 & -1 \\ 1 & 0 \\ 1 & 0 \end{bmatrix} \quad \frac{1}{2}\begin{bmatrix} 1 & 0 \\ 0 & 1 \\ 0 & j \\ -1 & 0 \end{bmatrix}$$

$$\frac{1}{2}\begin{bmatrix} 0 & 1 \\ 0 & -1 \\ 1 & 0 \\ -1 & 0 \end{bmatrix} \quad \frac{1}{2}\begin{bmatrix} 1 & 0 \\ 0 & 1 \\ j & 0 \\ 0 & 1 \end{bmatrix} \quad \frac{1}{2}\begin{bmatrix} 1 & 0 \\ j & 0 \\ 0 & 1 \\ 0 & j \end{bmatrix} \quad \frac{1}{2}\begin{bmatrix} 1 & 0 \\ -j & 0 \\ 0 & 1 \\ 0 & j \end{bmatrix}$$

$$\frac{1}{2}\begin{bmatrix} 0 & 1 \\ 1 & 0 \\ -j & 0 \\ 0 & j \end{bmatrix} \quad \frac{1}{2}\begin{bmatrix} 1 & 0 \\ 0 & 1 \\ j & 0 \\ 0 & -1 \end{bmatrix} \quad \frac{1}{2}\begin{bmatrix} 1 & 0 \\ 0 & 1 \\ -1 & 0 \\ 0 & j \end{bmatrix} \quad \frac{1}{2}\begin{bmatrix} 1 & 0 \\ j & 0 \\ 0 & 1 \\ 0 & -j \end{bmatrix}$$

$$\frac{1}{2}\begin{bmatrix} 1 & 0 \\ 0 & 1 \\ 0 & -j \\ -j & 0 \end{bmatrix} \quad \frac{1}{2}\begin{bmatrix} 1 & 0 \\ 0 & 1 \\ -j & 0 \\ 0 & -1 \end{bmatrix} \quad \frac{1}{2}\begin{bmatrix} 0 & 1 \\ 0 & -j \\ 1 & 0 \\ -j & 0 \end{bmatrix} \quad \frac{1}{2}\begin{bmatrix} 0 & 1 \\ 1 & 0 \\ 0 & 1 \\ -j & 0 \end{bmatrix}$$

In Table 2, each precoding matrix has 4 rows (i.e. four antennas) and 2 columns (i.e. rank-2, i.e. two layers). Since one zero element is included in each row even with two layers, the layers are not mixed. That is, there is no increase in PAPR at the power amplifier of each antenna.

If it is determined that a rank-3 channel is established between the transmit and receive antennas, the precoding matrices as shown in Table 3 can be used.

Table 3 sets forth an exemplary rank-3 codebook of the precoding matrices for 4 transmit antennas.

TABLE 3

$$\frac{1}{2\sqrt{2}}\begin{bmatrix} 1 & -j & 0 \\ -j & -j & 0 \\ -j & 0 & 1 \\ -j & 0 & -j \end{bmatrix} \quad \frac{1}{2\sqrt{2}}\begin{bmatrix} 1 & -j & 0 \\ -j & -j & 0 \\ j & 0 & 1 \\ j & 0 & -j \end{bmatrix} \quad \frac{1}{2\sqrt{2}}\begin{bmatrix} 1 & -j & 0 \\ j & -j & 0 \\ -j & 0 & 1 \\ j & 0 & -j \end{bmatrix}$$

$$\frac{1}{2\sqrt{2}}\begin{bmatrix} 1 & -j & 0 \\ j & -j & 0 \\ j & 0 & 1 \\ -j & 0 & -j \end{bmatrix} \quad \frac{1}{2\sqrt{2}}\begin{bmatrix} 1 & -j & 0 \\ -j & -j & 0 \\ -j & 0 & 1 \\ j & 0 & j \end{bmatrix} \quad \frac{1}{2\sqrt{2}}\begin{bmatrix} 1 & -j & 0 \\ -j & -j & 0 \\ j & 0 & 1 \\ -j & 0 & j \end{bmatrix}$$

$$\frac{1}{2\sqrt{2}}\begin{bmatrix} 1 & -j & 0 \\ j & -j & 0 \\ -j & 0 & 1 \\ -j & 0 & j \end{bmatrix} \quad \frac{1}{2\sqrt{2}}\begin{bmatrix} 1 & -j & 0 \\ j & -j & 0 \\ j & 0 & 1 \\ j & 0 & j \end{bmatrix} \quad \frac{1}{2\sqrt{2}}\begin{bmatrix} 1 & -j & 0 \\ -j & j & 0 \\ 1 & 0 & 1 \\ -1 & 0 & -j \end{bmatrix}$$

$$\frac{1}{2\sqrt{2}}\begin{bmatrix} 1 & -j & 0 \\ -j & j & 0 \\ -1 & 0 & 1 \\ 1 & 0 & -j \end{bmatrix} \quad \frac{1}{2\sqrt{2}}\begin{bmatrix} 1 & -j & 0 \\ j & j & 0 \\ 1 & 0 & 1 \\ 1 & 0 & -j \end{bmatrix} \quad \frac{1}{2\sqrt{2}}\begin{bmatrix} 1 & -j & 0 \\ j & j & 0 \\ -1 & 0 & 1 \\ -1 & 0 & -j \end{bmatrix}$$

$$\frac{1}{2\sqrt{2}}\begin{bmatrix} 1 & -j & 0 \\ -j & j & 0 \\ 1 & 0 & 1 \\ 1 & 0 & j \end{bmatrix} \quad \frac{1}{2\sqrt{2}}\begin{bmatrix} 1 & -j & 0 \\ -j & j & 0 \\ -1 & 0 & 1 \\ -1 & 0 & j \end{bmatrix} \quad \frac{1}{2\sqrt{2}}\begin{bmatrix} 1 & -j & 0 \\ j & j & 0 \\ 1 & 0 & 1 \\ -1 & 0 & j \end{bmatrix}$$

TABLE 3-continued $$\frac{1}{2\sqrt{2}}\begin{bmatrix} 1 & -j & 0 \\ j & j & 0 \\ -1 & 0 & 1 \\ 1 & 0 & j \end{bmatrix}$$

In Table 3, each precoding matrix has 4 rows (i.e. four antennas) and 3 columns (i.e. rank-3, i.e. three layers). Assuming that a precoding matrix (1) is selected from Table 3:

$$\frac{1}{2\sqrt{2}}\begin{bmatrix} 1 & -j & 0 \\ -j & -j & 0 \\ -j & 0 & 1 \\ -j & 0 & -j \end{bmatrix} \quad (1)$$

the outputs of four antennas are y1, y2, y3, and y4; the symbol data mapped to layer 1 (layer#1) is x1, the symbol data to layer 2 (layer#2) is x2, and the symbol data to layer 3 (layer#3) is x3. The relation between the layers and antennas can be expressed by Equation (2):

$$\begin{bmatrix} y1 \\ y2 \\ y3 \\ y4 \end{bmatrix} = \frac{1}{2\sqrt{2}}\begin{bmatrix} 1 & -j & 0 \\ -j & -j & 0 \\ -j & 0 & 1 \\ -j & 0 & -j \end{bmatrix}\begin{bmatrix} x1 \\ x2 \\ x3 \end{bmatrix} \quad (2)$$

In Equation (2), the output of antenna 1 (antenna#1) is expressed by $$y1 = \frac{1}{2\sqrt{2}}(x1 - jx2).$$

That is, the symbol data x1 mapped to layer 1 (layer#1) and the symbol data x2 mapped to layer 2 (layer#2), by the elements 1 and −j of the first row of the precoding matrix are mixed to be output and thus increases the PAPR of the power amplifier of antenna 1 (antenna#1). The output of antenna 2 (antenna#2) is expressed by $$y2 = \frac{1}{2\sqrt{2}}(-jx1 - jx2).$$

That is, the symbol data x1 mapped to layer 1 (layer#1) and the symbol data x2 mapped to layer 2 (layer#2) by the elements −j and −j of the second row of the precoding matrix are mixed to be output and thus increases the PAPR of the power amplifier of antenna 2 (antenna#2). The output of antenna 3 (antenna#4) is expressed by $$y3 = \frac{1}{2\sqrt{2}}(-jx1 + x3).$$

That is, the symbol data x1 mapped to layer 1 (layer#1) and the symbol data x2 mapped to layer 2 (layer#2) by the elements −j and 1 of the third row of the precoding matrix are mixed to be output and thus increases the PAPR of the power amplifier of antenna 3 (antenna#3). The output of antenna 4 (antenna#4) is expressed by $$y4 = \frac{1}{2\sqrt{2}}(-jx1 - jx3).$$

That is, the symbol data x1 mapped to layer 1 (layer#1) and the symbol data x2 mapped to layer 2 (layer#2) by the elements −j and −j of the fourth row of the precoding matrix are mixed to be output and thus increases the PAPR of the power amplifier of antenna 3 (antenna#4).

SUMMARY OF THE INVENTION

In order to overcome at least the problems of the prior art, the present invention provides a method and apparatus for designing precoding matrices of an SC-FDMA MIMO system that is capable of not only avoiding an increase in the PAPR of individual antenna power amplifiers but also improving system performance.

Also, the present invention provides a transmission method and apparatus for designing precoding matrices of an SC-FDMA MIMO system that is capable of restricting increases to the PAPR and improving system performance across the entire Signal to Noise Ratio (SNR) range from the low to the high SNR region.

In accordance with an aspect of the present invention, a transmission method using a codebook in a multiple-input multiple output system includes mapping multiple codewords to multiple layers; mapping the multiple layers to multiple antennas using a precoding matrix selected from a rank-3 codebook which is designed to map the codewords to different antennas; and transmitting the codewords through paths formed by mapping the layers and the antennas, wherein the precoding matrix of the rank-3 codebook is designed to equalize transmit power ratios between the antennas.

In accordance with another aspect of the present invention, a transmission apparatus using a codebook in a multiple-input multiple-output system includes a codeword-layer mapper which maps multiple codewords to multiple layers; a resource element mapper which maps the multiple layers to multiple antennas using a precoding matrix selected from a rank-3 codebook for mapping the codewords to different antennas; and the multiple antennas which transmit the codewords transferred via the layers, wherein the codewords are transmitted through paths formed by mapping the layers and the antennas, and the precoding matrix of the rank-3 codebook is designed to equalize transmit power ratios between the antennas.

In accordance with another aspect of the present invention, a reception method using a codebook in a multiple-input multiple-output system includes receiving signals through multiple antennas; mapping multiple layers to the multiple antennas using a precoding matrix from a rank-3 codebook designed to map codewords to different antennas; mapping multiple codewords to the multiple layers; and recovering the codewords from the signals received through paths formed by mapping the layers and the antennas, wherein the precoding matrix of the rank-3 codebook is designed to equalize transmit power ratios between the antennas I.

In accordance with still another aspect of the present invention, a reception apparatus using a codebook in a multiple-input multiple-output system includes a plurality of antennas which receive signals; a deprecoder which maps multiple layers to multiple antennas using a precoding matrix selected from a rank-3 codebook designed to map codewords to different antennas; a layer-codeword mapper which maps multiple codewords to the multiple layers; and a codeword recovery unit which recovers the codewords from the signals received through paths formed by mapping the layers and the antennas, wherein the precoding matrix of the rank-3 codebook is designed to equalize transmit power ratios between the antennas equal.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE INVENTION

Embodiments of the present invention are described with reference to the accompanying formulas and drawings in detail. Detailed descriptions of well-known functions and structures incorporated herein may be omitted to avoid obscuring the subject matter of the present invention. The terms stated below are defined in consideration of the functionalities in the present invention but may vary according to a user or operator's intention or a usual practice. Therefore, their definitions should be determined on the basis of the specification of the present invention.

In the embodiments of the present invention, descriptions are directed to the OFDM-based wireless communication system, particularly 3GPP EUTRA (or LTE) and Advanced EUTRA (or LTE-A), however, the subject matter of the present invention can be applied to other communication systems based on the similar technical background and channel formats with minor variations without departing from the scope of the present invention, and it can be understood by those skilled in the art.

The subject matter of the present invention is the use of rank-3 matrices with which two codewords are mapped to multiple individual antennas while maintaining the power per layer without mixing between layers at each antenna (i.e. without an increase to the PAPR) for a MIMO system using four transmit antennas. Since the rank-3 precoding matrices of the present invention have the same per-layer power, it is possible to solve the performance degradation problem caused by the inequality of the per-layer power. Also, since the precoding matrices of the present invention are proposed such that separate codewords are transmitted through the same number of the antennas, each codeword undergoes diversity effects with the multiple transmit antennas. The detailed description is made with the embodiments hereinbelow.

First Embodiment

A first embodiment is directed to a structure of a precoding matrix for mapping two codewords to two different antennas while maintaining equal power ratios of the layers without increase of PAPRs at individual antennas.

Figure 1:
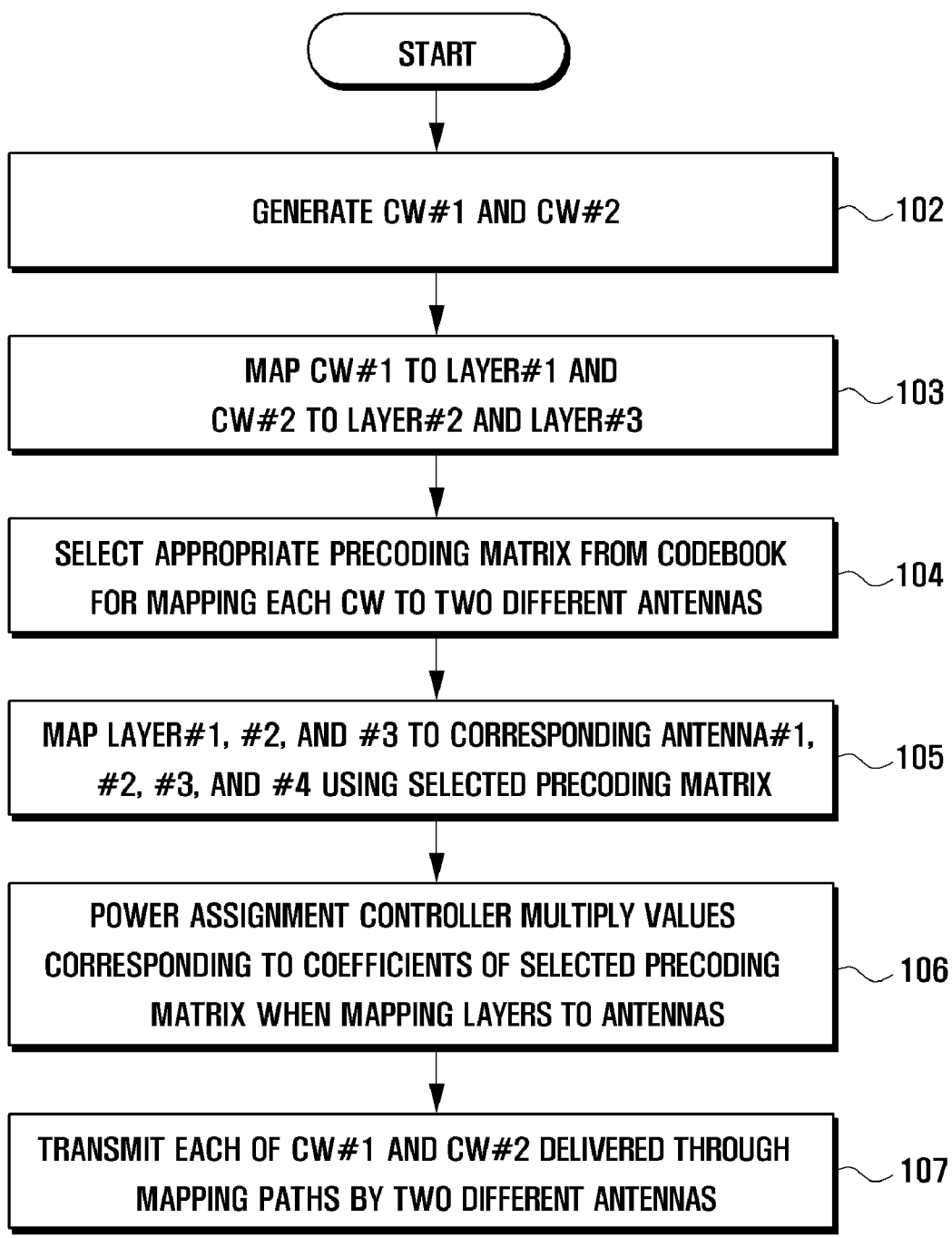
FIG. 1 is a flowchart illustrating a codebook mapping procedure of the transmission method according to a first embodiment of the present invention.

FIG. 1 is a flowchart illustrating a codebook mapping procedure of the transmission method according to the first embodiment of the present invention.

In FIG. 1, two codewords (CW#1 and CW#2) are mapped to three layers (Layer#1, Layer#2, and Layer#3), and the three layers (Layer#1, Layer#2, and Layer#3) are mapped to four antennas (Antenna#1, Antenna#2, Antenna#3, and Antenna#4) for transmitting the two different codewords through the four antennas.

Here, it is assumed that a codebook as shown in Table 4 is used. Table 4 shows a codebook consisting of a plurality of precoding matrices according to the first embodiment of the present invention.

TABLE 4

$$\begin{bmatrix} 1/\sqrt{2} & 0 & 0 \\ 0 & 1 & 0 \\ 1/\sqrt{2} & 0 & 0 \\ 0 & 0 & 1 \end{bmatrix} \begin{bmatrix} 0 & 1 & 0 \\ 1/\sqrt{2} & 0 & 0 \\ 0 & 0 & 1 \\ 1/\sqrt{2} & 0 & 0 \end{bmatrix} \begin{bmatrix} 1/\sqrt{2} & 0 & 0 \\ 1/\sqrt{2} & 0 & 0 \\ 0 & 1 & 0 \\ 0 & 0 & 1 \end{bmatrix}$$

$$\begin{bmatrix} 0 & 1 & 0 \\ 0 & 0 & 1 \\ 1/\sqrt{2} & 0 & 0 \\ 1/\sqrt{2} & 0 & 0 \end{bmatrix} \begin{bmatrix} 1/\sqrt{2} & 0 & 0 \\ 0 & 1 & 0 \\ -1/\sqrt{2} & 0 & 0 \\ 0 & 0 & 1 \end{bmatrix} \begin{bmatrix} 0 & 1 & 0 \\ 1/\sqrt{2} & 0 & 0 \\ 0 & 0 & 1 \\ -1/\sqrt{2} & 0 & 0 \end{bmatrix}$$

TABLE 4-continued $$\begin{bmatrix} 1/\sqrt{2} & 0 & 0 \\ -1/\sqrt{2} & 0 & 0 \\ 0 & 1 & 0 \\ 0 & 0 & 1 \end{bmatrix} \begin{bmatrix} 0 & 1 & 0 \\ 0 & 0 & 1 \\ 1/\sqrt{2} & 0 & 0 \\ -1/\sqrt{2} & 0 & 0 \end{bmatrix} \begin{bmatrix} 1/\sqrt{2} & 0 & 0 \\ 0 & 1 & 0 \\ 1/\sqrt{2}j & 0 & 0 \\ 0 & 0 & 1 \end{bmatrix}$$

$$\begin{bmatrix} 0 & 1 & 0 \\ 1/\sqrt{2} & 0 & 0 \\ 0 & 0 & 1 \\ 1/\sqrt{2}j & 0 & 0 \end{bmatrix} \begin{bmatrix} 1/\sqrt{2} & 0 & 0 \\ 1/\sqrt{2}j & 0 & 0 \\ 0 & 1 & 0 \\ 0 & 0 & 1 \end{bmatrix} \begin{bmatrix} 0 & 1 & 0 \\ 0 & 0 & 1 \\ 1/\sqrt{2} & 0 & 0 \\ 1/\sqrt{2}j & 0 & 0 \end{bmatrix}$$

$$\begin{bmatrix} 1/\sqrt{2} & 0 & 0 \\ 0 & 1 & 0 \\ -1/\sqrt{2}j & 0 & 0 \\ 0 & 0 & 1 \end{bmatrix} \begin{bmatrix} 0 & 1 & 0 \\ 1/\sqrt{2} & 0 & 0 \\ 0 & 0 & 1 \\ -1/\sqrt{2}j & 0 & 0 \end{bmatrix} \begin{bmatrix} 1/\sqrt{2} & 0 & 0 \\ -1/\sqrt{2}j & 0 & 0 \\ 0 & 1 & 0 \\ 0 & 0 & 1 \end{bmatrix}$$

$$\begin{bmatrix} 0 & 1 & 0 \\ 0 & 0 & 1 \\ 1/\sqrt{2} & 0 & 0 \\ -1/\sqrt{2}j & 0 & 0 \end{bmatrix}$$

As shown in Table 4, the first embodiment is directed to a MIMO system using four antennas and rank-3. In the case where multiple codebooks are input, the multiple codebooks are mapped to different antennas.

Referring to FIG. 1, the transmitter generates two codewords (CW#1 and CW#2) in step 102.

Next, in step 103, the transmitter maps the codeword 1 (CW#1) to layer 1 (Layer#1) and the codeword to layer 2 (Layer#2) and Layer 3 (Layer#3).

Then, in step 104, the transmitter selects a precoding matrix, with which the most data can be transmitted in the rank-3 channel environment, from the code book of Table 4. That is, the transmitter chooses one of the precoding matrices, each mapping the codeword 1 (CW#1) and codeword 2 (CW#2) to separate antennas.

Here, it is assumed that the transmitter selects the precoding matrix (3) shown below from the codebook by means of a scheduler:

$$\begin{bmatrix} 1/\sqrt{2} & 0 & 0 \\ 1/\sqrt{2} & 0 & 0 \\ 0 & 1 & 0 \\ 0 & 0 & 1 \end{bmatrix}. \quad (3)$$

In step 105, the transmitter maps the layer 1 (Layer#1) to the antenna 1 (Antenna#1) and antenna 2 (Antenna#2), the layer 2 (Layer#2) to the antenna 3 (Antenna#3), and the layer 3 (Layer#3) to the antenna 4 (Antenna#4) using the selected precoding matrix (3).

In step 106, a power assignment controller 213 of the transmitter multiplies the non-zero values of the elements of the precoding matrix between the corresponding layers and antennas so as to equalize the powers of the separate layers.

That is, when using the precoding matrix (3), the precoder of the transmitter multiplies a value P1 between the layer 1 (Layer#1) and the antenna 1 (Antenna#1), a value P2 between the layer 1 (Layer#1) and the antenna 2 (Antenna#2), a value P3 between the layer 2 (Layer#2) and the antenna 3 (Antenna#3), and a value P4 between the layer 3 (Layer#3) and the antenna 4 (Antenna#4).

In this embodiment, P1 and P2 have the value of $1/\sqrt{2}$. If the codebook is expressed in a normalized form, P1 and P2 become $1/\sqrt{6}$. Also, P3 and P4 have the value of 1. If the code book is expressed in the normalized form, P3 and P4 become $1/\sqrt{3}$.

Next, in step 107, the transmitter transmits the codewords mapped in the above-described manner through two different antennas.

Since the codeword 1 (CW#1) is mapped to the layer 1 (Layer#1), the codeword 1 (CW#1) is transmitted through the antenna 1 (Antenna#1) and antenna 2 (Antenna#2). Also, since the codeword 2 (CW#2) is mapped to the layer 2 (Layer#2) and layer 3 (Layer#3), the codeword 2 is transmitted through the antenna 3 (Antenna#3) and antenna 4 (Antenna#4).

That is, each of the codewords (CW#1 and CW#2) is transmitted two different antennas, and the power ratios of the layers (Layer#1, Layer#2, and Layer#3) are equal to each other.

Figure 2:
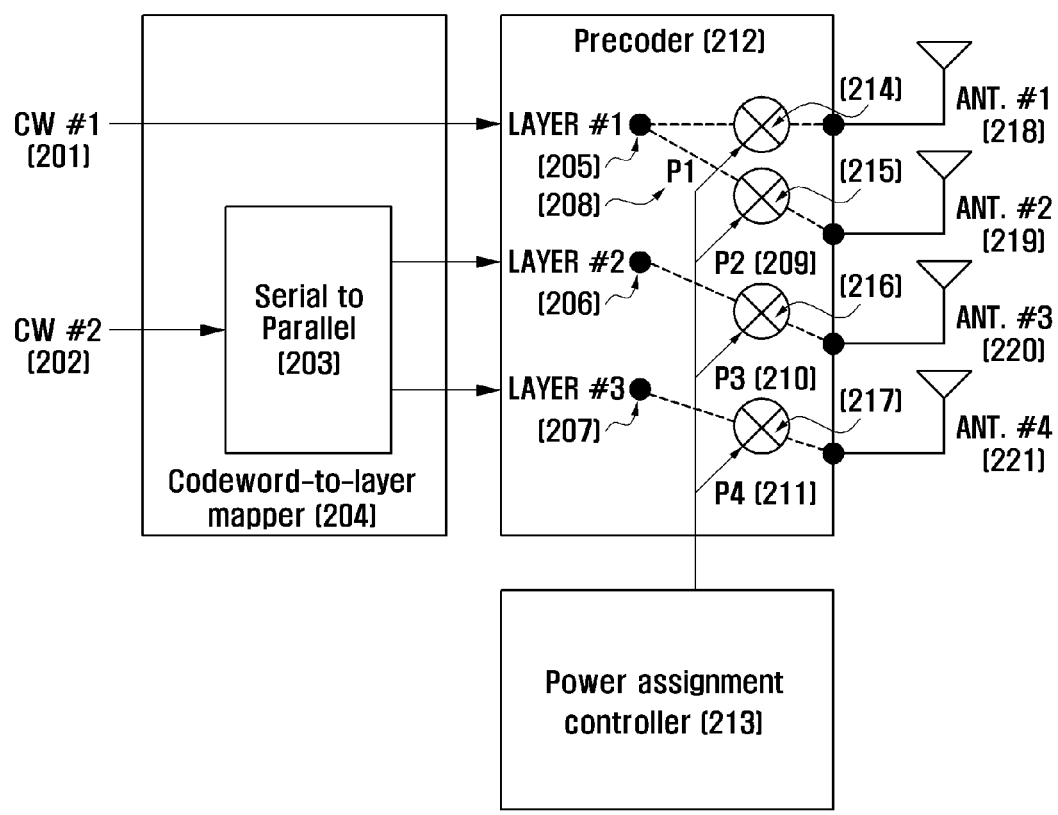
FIG. 2 is a block diagram illustrating a configuration of the transmitter for use in the transmission method according to the first embodiment of the present invention.

FIG. 2 is a block diagram illustrating a configuration of the transmitter for use in the transmission method according to the first embodiment of the present invention.

As shown in FIG. 2, the transmitter according to the first embodiment of the present invention includes a mapper (codeword-to-layer mapper) 204, a precoder 212, a power assignment controller 213, and a plurality of antennas 218, 219, 220, and 221. The mapper 204 is responsible for mapping the multiple codewords to the multiple layers.

The mapper 204 is provided with a serial to parallel converter 203 for mapping a codeword to at least two layers. In FIG. 2, the serial to parallel converter 203 divides an input codeword into two parts that are mapped to two separate layers.

The precoder 212 is responsible for mapping the layers to corresponding antennas. That is, the precoder 212 maps the layer 1 (Layer#1) 205 to the antenna 1 (Antenna#1) 218 and antenna 2 (Antenna#2) 219. Also, the precoder 212 maps the layer 2 (Layer#2) 206 to the antenna 3 (Antenna#3) 220 and maps the layer 3 (Layer#3) 207 to the antenna 4 (Antenna#4) 221.

The power assignment controller 213 multiplies the non-zero element values (P1, P2, P3, and P4) of the precoding matrix selected from the codebook of Table 4 between the layers 205, 206, and 207 and the antennas 218, 219, 220, and 221 by means of the multipliers 214, 215, 216, and 217 and equalizes the powers allocated to the layers 205, 206, and 207.

That is, in the precoder 212, P1 208 is multiplied between the layer 1 (Layer#1) 205 and the antenna 1 (Antenna#1) 218 by means of the multiplier 214, and P2 209 is multiplied between the layer 1 (Layer#1) 205 and the antenna 2 (Antenna#2) 219 by the multiplier 215.

If the precoding matrix (3) is selected, P1 208 and P2 209 are $1/\sqrt{2}$. If the codebook is expressed in a normalized form, P1 208 and P2 209 become $1/\sqrt{6}$. Here, P3 210 and P4 211 have the value of 1. If the codebook is expressed in a normalized form, P3 210 and P4 211 become $1/\sqrt{3}$.

Table 5 is a normalized form of the codebook of Table 4. That is, Table 5 shows the normalized forms of the precoding matrices of the codebook according to the first embodiment of the present invention.

TABLE 5

$$\frac{1}{\sqrt{3}}\begin{bmatrix} 1/\sqrt{2} & 0 & 0 \\ 0 & 1 & 0 \\ 1/\sqrt{2} & 0 & 0 \\ 0 & 0 & 1 \end{bmatrix} \quad \frac{1}{\sqrt{3}}\begin{bmatrix} 0 & 1 & 0 \\ 1/\sqrt{2} & 0 & 0 \\ 0 & 0 & 1 \\ 1/\sqrt{2} & 0 & 0 \end{bmatrix}$$

$$\frac{1}{\sqrt{3}}\begin{bmatrix} 1/\sqrt{2} & 0 & 0 \\ 1/\sqrt{2} & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ 1/\sqrt{2} & 0 & 0 \end{bmatrix}$$

$$\frac{1}{\sqrt{3}}\begin{bmatrix} 1/\sqrt{2} & 0 & 0 \\ 0 & 1 & 0 \\ -1/\sqrt{2} & 0 & 0 \\ 0 & 0 & 1 \end{bmatrix} \quad \frac{1}{\sqrt{3}}\begin{bmatrix} 0 & 1 & 0 \\ 1/\sqrt{2} & 0 & 0 \\ 0 & 0 & 1 \\ -1/\sqrt{2} & 0 & 0 \end{bmatrix}$$

$$\frac{1}{\sqrt{3}}\begin{bmatrix} 1/\sqrt{2} & 0 & 0 \\ -1/\sqrt{2} & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ -1/\sqrt{2} & 0 & 0 \end{bmatrix}$$

$$\frac{1}{\sqrt{3}}\begin{bmatrix} 1/\sqrt{2} & 0 & 0 \\ 0 & 1 & 0 \\ 1/\sqrt{2}j & 0 & 0 \\ 0 & 0 & 1 \end{bmatrix} \quad \frac{1}{\sqrt{3}}\begin{bmatrix} 0 & 1 & 0 \\ 1/\sqrt{2} & 0 & 0 \\ 0 & 0 & 1 \\ 1/\sqrt{2}j & 0 & 0 \end{bmatrix}$$

$$\frac{1}{\sqrt{3}}\begin{bmatrix} 1/\sqrt{2} & 0 & 0 \\ 1/\sqrt{2}j & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ 1/\sqrt{2}j & 0 & 0 \end{bmatrix}$$

$$\frac{1}{\sqrt{3}}\begin{bmatrix} 1/\sqrt{2} & 0 & 0 \\ 0 & 1 & 0 \\ -1/\sqrt{2}j & 0 & 0 \\ 0 & 0 & 1 \end{bmatrix} \quad \frac{1}{\sqrt{3}}\begin{bmatrix} 0 & 1 & 0 \\ 1/\sqrt{2} & 0 & 0 \\ 0 & 0 & 1 \\ -1/\sqrt{2}j & 0 & 0 \end{bmatrix}$$

$$\frac{1}{\sqrt{3}}\begin{bmatrix} 1/\sqrt{2} & 0 & 0 \\ -1/\sqrt{2}j & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ -1/\sqrt{2}j & 0 & 0 \end{bmatrix}$$

Table 6 is a codebook in which the rows of the precoding matrices of the codebook of Table 4 are permutated.

TABLE 6

$$\begin{bmatrix} 1/\sqrt{2} & 0 & 0 \\ 0 & 0 & 1 \\ 1/\sqrt{2} & 0 & 0 \\ 0 & 1 & 0 \end{bmatrix} \quad \begin{bmatrix} 0 & 1 & 0 \\ 1/\sqrt{2} & 0 & 0 \\ 0 & 0 & 1 \\ 1/\sqrt{2} & 0 & 0 \end{bmatrix} \quad \begin{bmatrix} 1/\sqrt{2} & 0 & 0 \\ 0 & 0 & 1 \\ 0 & 1 & 0 \\ 1/\sqrt{2} & 0 & 0 \end{bmatrix}$$

$$\begin{bmatrix} 0 & 1 & 0 \\ 1/\sqrt{2} & 0 & 0 \\ 1/\sqrt{2} & 0 & 0 \\ 0 & 0 & 1 \end{bmatrix} \quad \begin{bmatrix} 1/\sqrt{2} & 0 & 0 \\ 0 & 0 & 1 \\ -1/\sqrt{2} & 0 & 0 \\ 0 & 1 & 0 \end{bmatrix} \quad \begin{bmatrix} 0 & 1 & 0 \\ -1/\sqrt{2} & 0 & 0 \\ 0 & 0 & 1 \\ 1/\sqrt{2} & 0 & 0 \end{bmatrix}$$

TABLE 6-continued $$\begin{bmatrix} 1/\sqrt{2} & 0 & 0 \\ 0 & 0 & 1 \\ 0 & 1 & 0 \\ -1/\sqrt{2} & 0 & 0 \end{bmatrix} \begin{bmatrix} 0 & 1 & 0 \\ -1/\sqrt{2} & 0 & 0 \\ 1/\sqrt{2} & 0 & 0 \\ 0 & 0 & 1 \end{bmatrix} \begin{bmatrix} 1/\sqrt{2} & 0 & 0 \\ 0 & 0 & 1 \\ 1/\sqrt{2}j & 0 & 0 \\ 0 & 1 & 0 \end{bmatrix}$$

$$\begin{bmatrix} 0 & 1 & 0 \\ 1/\sqrt{2}j & 0 & 0 \\ 0 & 0 & 1 \\ 1/\sqrt{2} & 0 & 0 \end{bmatrix} \begin{bmatrix} 1/\sqrt{2} & 0 & 0 \\ 0 & 0 & 1 \\ 0 & 1 & 0 \\ 1/\sqrt{2}j & 0 & 0 \end{bmatrix} \begin{bmatrix} 0 & 1 & 0 \\ -1/\sqrt{2}j & 0 & 0 \\ 1/\sqrt{2} & 0 & 0 \\ 0 & 0 & 1 \end{bmatrix}$$

$$\begin{bmatrix} 1/\sqrt{2} & 0 & 0 \\ 0 & 0 & 1 \\ -1/\sqrt{2}j & 0 & 0 \\ 0 & 1 & 0 \end{bmatrix} \begin{bmatrix} 0 & 1 & 0 \\ -1/\sqrt{2}j & 0 & 0 \\ 0 & 0 & 1 \\ 1/\sqrt{2} & 0 & 0 \end{bmatrix} \begin{bmatrix} 1/\sqrt{2} & 0 & 0 \\ 0 & 0 & 1 \\ 0 & 1 & 0 \\ -1/\sqrt{2}j & 0 & 0 \end{bmatrix}$$

$$\begin{bmatrix} 0 & 1 & 0 \\ -1/\sqrt{2}j & 0 & 0 \\ 1/\sqrt{2} & 0 & 0 \\ 0 & 0 & 1 \end{bmatrix}$$

Table 6 shows one of 12 available codebooks that can be obtained by performing row permutation in the codebook of Table 4. The codebook of Table 6 is generated by permuting the second and fourth rows of the precoding matrices of the codebook of Table 4. It is possible to generate 12 different code books from the codebook of Table 4 by means of row permutation.

Second Embodiment

A second embodiment is directed to a structure of a precoding matrix for mapping two codewords to two different antennas while maintaining equal power ratios of the layers without an increase in the PAPR at the individual antennas.

Figure 3:
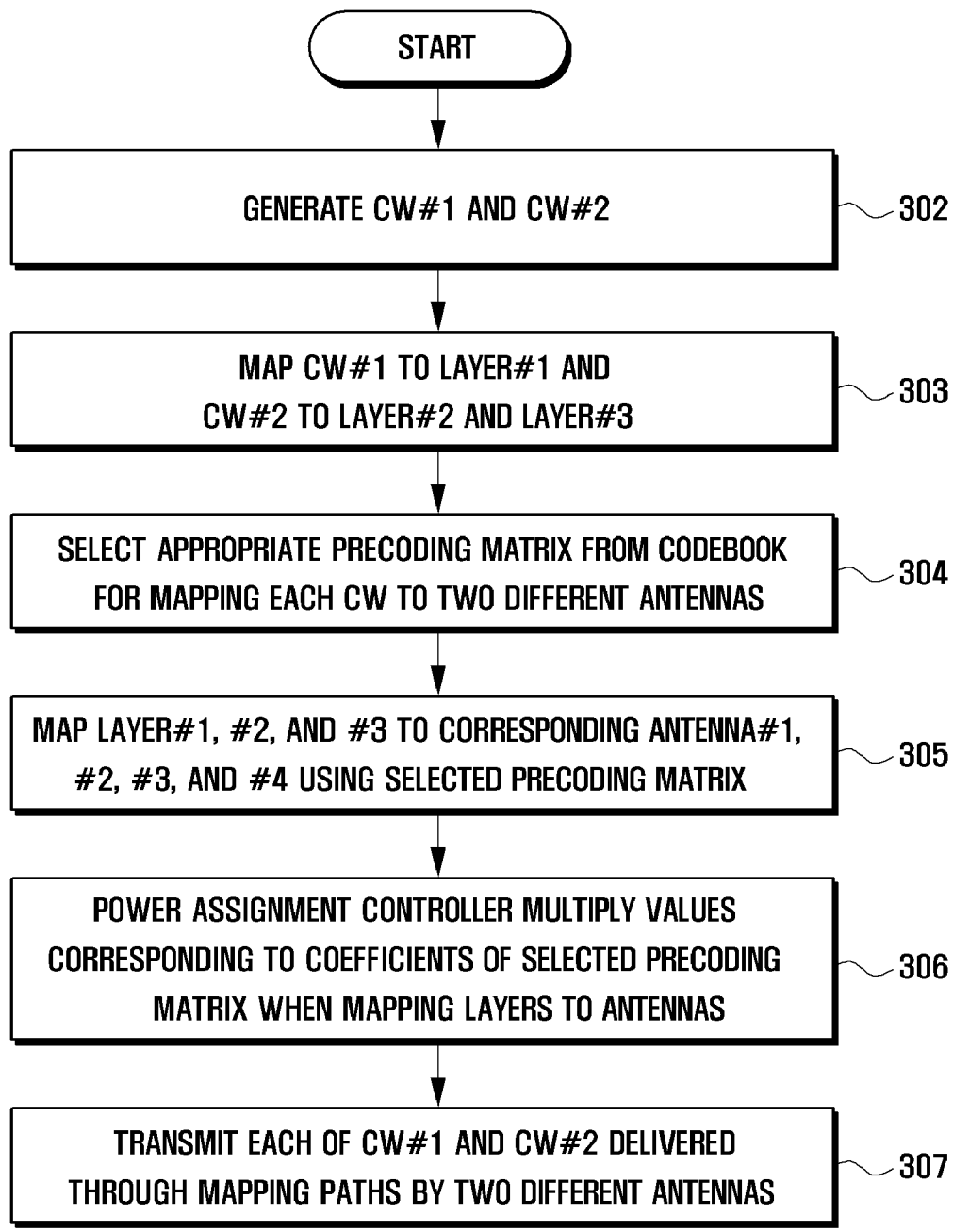
FIG. 3 is a flowchart illustrating a codebook mapping procedure of the transmission method according to a second embodiment of the present invention.

FIG. 3 is a flowchart illustrating a codebook mapping procedure of the transmission method according to the second embodiment of the present invention.

In FIG. 3, two codewords (CW#1 and CW#2) are mapped to three layers (Layer#1, Layer#2, and Layer#3), and the three layers are mapped to four antennas (Antenna#1, Antenna#2, Antenna#3, and Antenna#4) for transmitting two different codewords through the four antennas.

Here, it is assumed that a codebook as shown in table 7 is used. Table 7 shows a codebook consisted of a precoding matrices according to the second embodiment of the present invention.

TABLE 7

$$\begin{bmatrix} 0 & 0 & 1/\sqrt{2} \\ 1 & 0 & 0 \\ 0 & 0 & 1/\sqrt{2} \\ 0 & 1 & 0 \end{bmatrix} \begin{bmatrix} 1 & 0 & 0 \\ 0 & 0 & 1/\sqrt{2} \\ 0 & 1 & 0 \\ 0 & 0 & 1/\sqrt{2} \end{bmatrix} \begin{bmatrix} 0 & 0 & 1/\sqrt{2} \\ 0 & 0 & 1/\sqrt{2} \\ 1 & 0 & 0 \\ 0 & 1 & 0 \end{bmatrix}$$

$$\begin{bmatrix} 1 & 0 & 0 \\ 0 & 1 & 0 \\ 0 & 0 & 1/\sqrt{2} \\ 0 & 0 & 1/\sqrt{2} \end{bmatrix} \begin{bmatrix} 0 & 0 & 1/\sqrt{2} \\ 1 & 0 & 0 \\ 0 & 0 & -1/\sqrt{2} \\ 0 & 1 & 0 \end{bmatrix} \begin{bmatrix} 1 & 0 & 0 \\ 0 & 0 & 1/\sqrt{2} \\ 0 & 1 & 0 \\ 0 & 0 & -1/\sqrt{2} \end{bmatrix}$$

$$\begin{bmatrix} 0 & 0 & 1/\sqrt{2} \\ 0 & 0 & -1/\sqrt{2} \\ 1 & 0 & 0 \\ 0 & 1 & 0 \end{bmatrix} \begin{bmatrix} 1 & 0 & 0 \\ 0 & 1 & 0 \\ 0 & 0 & 1/\sqrt{2} \\ 0 & 0 & -1/\sqrt{2} \end{bmatrix} \begin{bmatrix} 0 & 0 & 1/\sqrt{2} \\ 1 & 0 & 0 \\ 0 & 0 & 1/\sqrt{2}j \\ 0 & 1 & 0 \end{bmatrix}$$

$$\begin{bmatrix} 1 & 0 & 0 \\ 0 & 0 & 1/\sqrt{2} \\ 0 & 1 & 0 \\ 0 & 0 & 1/\sqrt{2}j \end{bmatrix} \begin{bmatrix} 0 & 0 & 1/\sqrt{2} \\ 0 & 0 & 1/\sqrt{2}j \\ 1 & 0 & 0 \\ 0 & 1 & 0 \end{bmatrix} \begin{bmatrix} 1 & 0 & 0 \\ 0 & 1 & 0 \\ 0 & 0 & 1/\sqrt{2} \\ 0 & 0 & 1/\sqrt{2}j \end{bmatrix}$$

$$\begin{bmatrix} 0 & 0 & 1/\sqrt{2} \\ 1 & 0 & 0 \\ 0 & 0 & -1/\sqrt{2}j \\ 0 & 1 & 0 \end{bmatrix} \begin{bmatrix} 1 & 0 & 0 \\ 0 & 0 & 1/\sqrt{2} \\ 0 & 1 & 0 \\ 0 & 0 & -1/\sqrt{2}j \end{bmatrix} \begin{bmatrix} 0 & 0 & 1/\sqrt{2} \\ 0 & 0 & -1/\sqrt{2}j \\ 1 & 0 & 0 \\ 0 & 1 & 0 \end{bmatrix}$$

$$\begin{bmatrix} 1 & 0 & 0 \\ 0 & 1 & 0 \\ 0 & 0 & 1/\sqrt{2} \\ 0 & 0 & -1/\sqrt{2}j \end{bmatrix}$$

As shown in table 7, the second embodiment is directed to a MIMO using four antennas and rank-3.

Referring to FIG. 3, in step 302, the transmitter generates two codewords (CW#1 and CW#2). Next, in step 303, the transmitter maps the codeword 1 (CW#1) to the layer 1 (Layer#1) and layer 2 (Layer#2) and maps the codeword 2 (CW#2) to the layer 3 (Layer#3).

The scheduler of the transmitter selects a precoding matrix, with which the most data can be transmitted in the rank-3 channel environment, from the codebook of Table 7 on the basis of the channel information. In this embodiment, it is assumed that the scheduler selects the precoding matrix (4) shown below from the codebook of Table 7:

$$\begin{bmatrix} 1 & 0 & 0 \\ 0 & 1 & 0 \\ 0 & 0 & 1/\sqrt{2} \\ 0 & 0 & -1/\sqrt{2}j \end{bmatrix} \quad (4)$$

In step 305, the transmitter maps the layer 1 (Layer#1) to the antenna 1 (Antenna#1), the layer 2 (Layer#2) to the antenna 2 (Antenna#2), and the layer 3 (Layer#3) to the antenna 3 (Antenna#3) and antenna 4 (Antenna#4) using the precoding matrix (4).

At this time, in step 306, the power assignment controller multiplies the values of non-zero elements of the precoding matrix between the corresponding layers and antennas. As a result, the powers of the respective layers become equal to each other.

That is, according to the precoding matrix (4), P1 is multiplied between the layer 1 (Layer#1) and the antenna 1 (Antenna#1), P2 is multiplied between the layer 2 (Layer#2) and the antenna 2 (Antenna#2), P3 is multiplied between the layer 3 (Layer#3) and the antenna 3 (Antenna#3), and P4 is multiplied between the layer 3 (Layer#3) and the antenna 4 (Antenna#4). As shown in the precoding matrix (4), P1 and P2 have a value of 1. If the codebook is expressed in a normalized form, P1 and P2 become $1/\sqrt{3}$. Also, P3 and P4 have the values of $1/\sqrt{2}$ and $-1/\sqrt{2}j$, respectively, in the precoding matrix (4). If the codebook is expressed in the normalized form, P3 and P4 become $1/\sqrt{6}$ and $-1/\sqrt{6}j$, respectively.

Next, in step 307, the transmitter transmits the codewords mapped in the above-described manner through the two different antennas. That is, since the codeword 1 (CW#1) is mapped to the layer 1 (Layer#1) and the layer 2 (Layer#2), it is transmitted through the antenna 1 (Antenna#1) and the antenna 2 (Antenna#2). Also, since the codeword 2 (CW#2) is mapped to the layer 3 (Layer#3), it is transmitted through the antenna 3 (Antenna#3) and the antenna 4 (Antenna#4). In this manner, each of the codeword 1 (CW#1) and the codeword 2 (CW#2) are transmitted through two different antennas, and at this time the power ratios of the layers 1, 2, and 3 (Layer#1, Layer#2, and Layer#3) are equal to each other.

Figure 4:
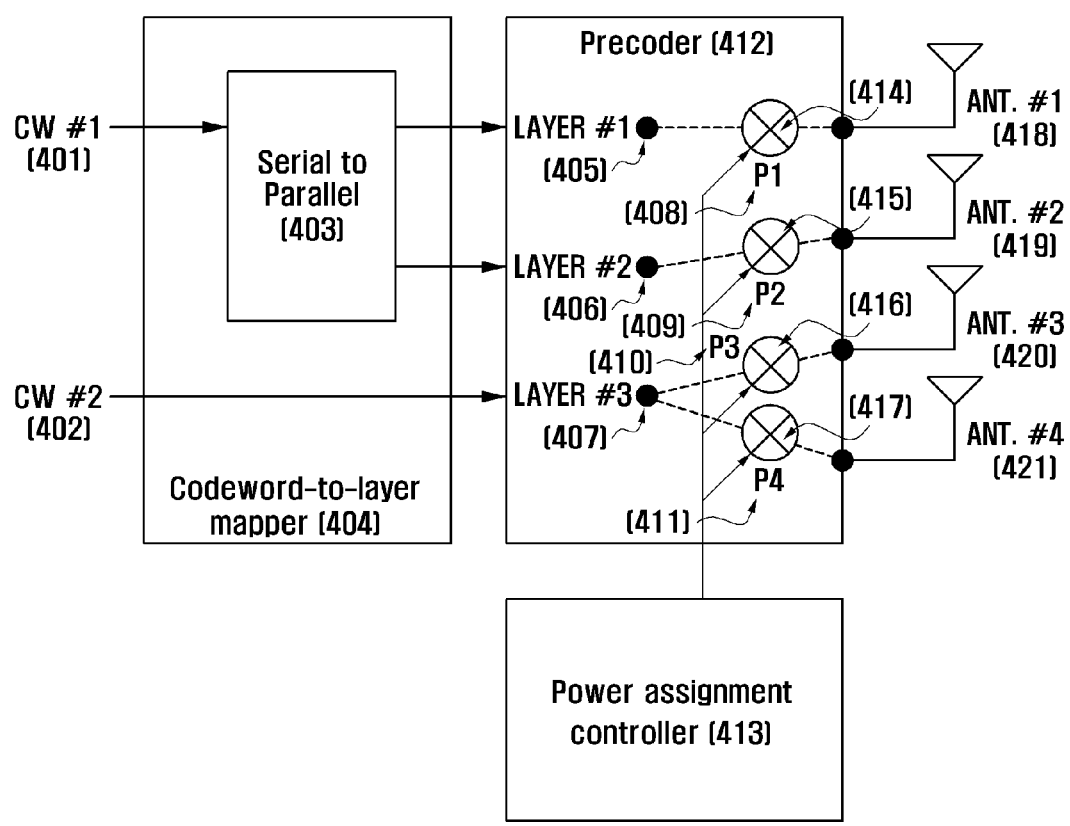
FIG. 4 is a block diagram illustrating a configuration of a transmitter for use in the transmission method according to the second embodiment of the present invention.

FIG. 4 is a block diagram illustrating a configuration of a transmitter for use in the transmission method according to the second embodiment of the present invention.

As shown in FIG. 4, the transmitter according to the second embodiment of the present invention includes a mapper (codeword-to-layer mapper) 404, a precoder 412, a power assignment controller 413, and a plurality of antennas 418, 419, 420, and 421.

The precoder 412 is responsible for mapping antennas per layer. That is, the precoder 412 maps the layer 1 (Layer#1) 405 to the antenna 1 (Antenna#1) 418, the layer 2 (Layer#2) to the antenna 2 (Antenna#2) 419, and the layer 3 (Layer#3) to the antenna 3 (Antenna#3) and the antenna 4 (Antenna#4).

The power assignment controller 413 multiplies the values of non-zero elements (P1, P2, P3, and P4) 408, 409, 410, and 411 of the precoding matrix selected from Table 7 between corresponding layers 405, 406, and 407 and the antennas 418, 419, 420, and 421 by means of multipliers 414, 415, 416, and 417. That is, the precoder 412 multiplies P1 408 between the layer 1 (Layer#1) 405 and the antenna 1 (Antenna#1) 418 by means of the multiplier 414 and multiplies P2 between the layer 2 (Layer#2) 406 and the antenna 2 (Antenna#2) 419 by means of the multiplier 415.

In the precoding matrix (4), P1 and P2 have the value of 1. If the codebook is expressed in the normalized form, P1 408 and P2 409 become $1/\sqrt{3}$. The codeword 2 (CW#2) 402 is mapped to the layer 3 (Layer#3) 407, and the layer 3 (Layer#3) is mapped to the antenna 3 (Antenna#3) 420 and the antenna 4 (Antenna#4) 421.

The precoder 412 multiplies P3 410 between the layer 3 (Layer#3) and the antenna 3 (Antenna#3) by means of the multiplier 416 and multiplies P4 411 between the layer 3 (Layer#3) and the antenna 4 (Antenna#4) by means of the multiplier 417. In the precoding matrix (4), P3 has the value of $1/\sqrt{2}$, and P4 has the value of $-1/\sqrt{2}j$. If the codebook is expressed in the normalized form, P3 becomes $1/\sqrt{6}$, and P4 becomes $-1/\sqrt{6}j$.

Third Embodiment

A third embodiment is directed to a structure of a precoding matrix for maintaining equal power ratios of the layers without an increase in the PAPR at the individual antennas.

Figure 5:
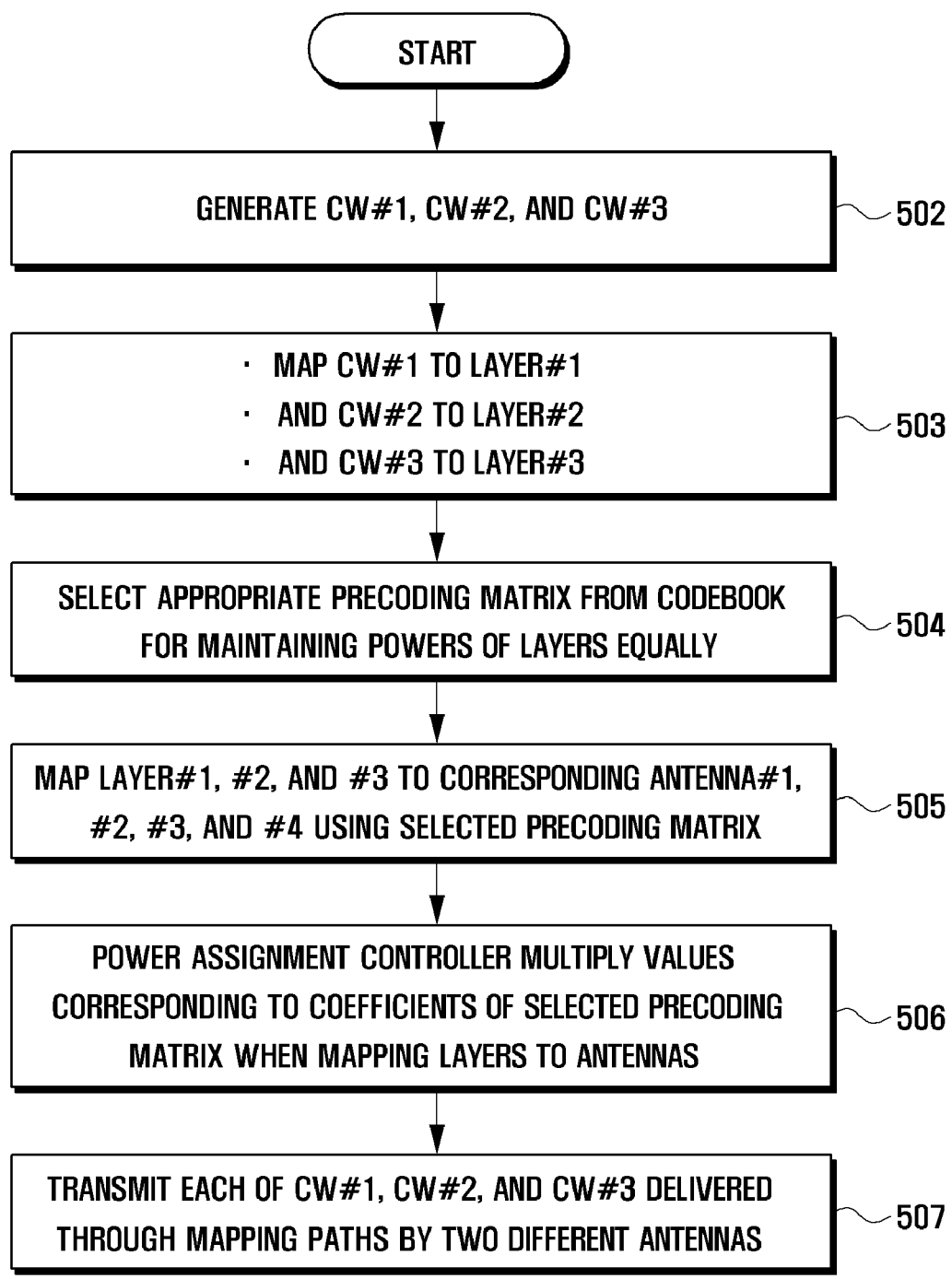
FIG. 5 is a flowchart illustrating a codebook mapping procedure of the transmission method according to a third embodiment of the present invention.

FIG. 5 is a flowchart illustrating a codebook mapping procedure of the transmission method according to the third embodiment of the present invention.

In FIG. 5, three codewords (CW#1, CW#2, and CW#3) are mapped to three layers (Layer#1, Layer#2, and Layer#3), and the three layers are mapped to four antennas (Antenna#1, Antenna#2, Antenna#3, and Antenna#4) for transmitting the three different codewords through the four antennas. Here, it is assumed that a codebook as shown in Table 4 is used.

In step 502, the transmitter first generates three codewords (CW#1, CW#2, and CW#3). Next, in step 503, the transmitter maps the codeword 1 (CW#1) to the layer 1 (Layer#1), the codeword 2 (CW#2) to the layer 2 (Layer#2), and the codeword 3 (CW#3) to the layer (Layer#3).

In step 504, the scheduler of the transmitter selects a precoding matrix from the codebook of Table 4 on the basis of the channel information. In this embodiment, it is assumed that the scheduler selects the precoding matrix (3).

The transmitter maps the layer 1 (Layer#1) to the antenna 1 (Antenna#1) and the antenna 2 (Antenna#2), the layer 2 (Layer#2) to the antenna 3 (Antenna#3), and the layer 3 (Layer#3) to the antenna 4 (Antenna#4) using the precoding matrix (3) (505).

In step 506, the power assignment controller of the transmitter multiples the values of the non-zero elements of the precoding matrix between the corresponding layers and antennas. That is, according to the precoding matrix (3), P1 is multiplied between the layer 1 (Layer#1) and the antenna 1 (Antenna#1), P2 is multiplied between the layer 1 (Layer#1) and the antenna 2 (Antenna#2), P3 is multiplied between the layer 2 (Layer#2) and the antenna 3 (Antenna#3), and P3 is multiplied between the layer 3 (Layer#3) and the antenna 4 (Antenna#4), in the precoder.

In the precoding matrix (3), P1 and P2 have the value of $1/\sqrt{2}$. If the codebook is expressed in the normalized form, P1 and P2 become $1/\sqrt{6}$. Also, P3 and P4 have the value of 1 in the precoding matrix (3). If the code book is expressed in the normalized form, p3 and P4 become $1/\sqrt{3}$.

Next, in step 507, the transmitter transmits the codewords mapped in the above-described manner through the four antennas.

Since the codeword 1 (CW#1) is mapped to the layer 1 (Layer#1), the codeword 1 (CW#1) is transmitted through the antenna 1 (Antenna#1) and the antenna 2 (Antenna#2). Also, the codeword 2 (CW#2) mapped to the layer 2 (Layer#2) is transmitted through the antenna 3 (Antenna#3). Since the codeword 3 (CW#3) is mapped to the layer 3 (Layer#3), the codeword 3 (CW#3) is transmitted through the antenna 4 (Antenna#4). In this manner, the codewords (CW#1, CW#2, and CW#3) mapped to the layers (Layer#1, Layer#2, and Layer#3), and the power ratios of the layers (Layer#1, Layer#2, and Layer#3) are equal to each other.

Figure 6:
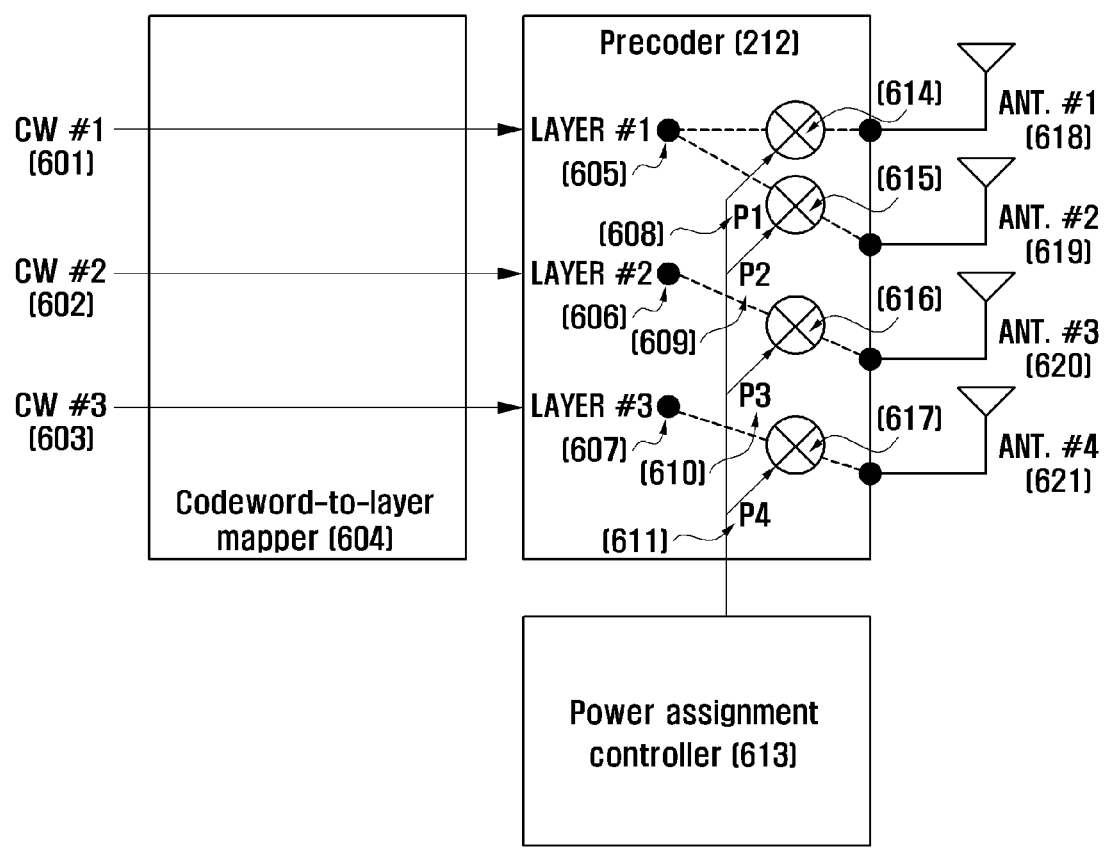
FIG. 6 is a block diagram illustrating a configuration of the transmitter for use in the transmission method according to the third embodiment of the present invention.

FIG. 6 is a block diagram illustrating a configuration of the transmitter for use in the transmission method according to the third embodiment of the present invention.

As shown in FIG. 6, the transmitter according to the third embodiment of the present invention includes a mapper (codeword-to-layer mapper) 604, a precoder 612, a power assignment controller 613, and a plurality of antennas 618, 619, 620, and 621.

The mapper 604 is responsible for mapping a codeword to one layer. That is, the mapper 604 maps the codeword 1 (CW#1) 601 to the layer 1 (Layer#1) 605, the codeword 2 (CW#2) 602 to the layer 2 (Layer#2), and the codeword 3 (CW#3) 603 to the layer 3 (Layer#3).

The precoder 612 is responsible for mapping the antennas per layer. That is, the precoder 612 maps the layer 1 (Layer#1) 605 to the antenna 1 (Antenna#1) 618 and the antenna (Antenna#2) 619, the layer 2 (Layer#2) 606 to the antenna 3

(Antenna#3) 620, and the layer 3 (Layer#3) 607 to the antenna 4 to (Antenna#4) 621.

The power assignment controller 613 multiplies the values (P1, P2, P3, and P4) 608, 609, 610, and 611 of the non-zero elements of the precoding matrix (3) between the corresponding layers and antennas by means of multipliers 614, 615, 616, and 617. In the precoder 612, P1 608 is multiplied between the layer 1 (Layer#1) 605 and the antenna 1 (Antenna#1) 618 by means of the multiplier 614, and P2 609 is multiplied between the layer 1 (Layer#1) 605 and the antenna 2 (Antenna#2) 619 by means of the multiplier 615.

In the third embodiment, P1 608 and P2 609 have a value of $1/\sqrt{2}$. If the codebook is expressed in the normalized form, the P1 608 and P2 609 become $1/\sqrt{6}$. The codeword 2 (CW#2) is mapped to the layer 2 (Layer#2) 606, and the layer 2 (Layer#2) 606 is mapped to the antenna 3 (Antenna#3) 620 by the precoder 612. The codeword 3 (CW#3) 603 is mapped to the layer 3 (Layer#3) 607, and the layer 3 (Layer#3) 607 is mapped to the antenna 4 (Antenna #4) 621 by the precoder 612.

In the precoder 612, P3 610 is multiplied between the layer 2 (Layer#2) 606 and the antenna 3 (Antenna#3) by means of the multiplier 615, P4 611 is multiplied between the layer 3 (Layer#3) 607 and the antenna 4 (Antenna#4) 621 by means of the multiplier 617. In the third embodiment, P3 and P4 have the value of 1. If the codebook is expressed in the normalized form, P4 and P4 become $1/\sqrt{3}$.

As shown in Tables 4 and 7, each row of the precoding matrices of the codebooks according to the embodiments includes one non-zero element. Accordingly, it is possible to map the antennas per codeword. That is, multiple codewords can be transmitted through different antennas regardless of the number of layers.

Also, the precoding matrices of the codebook according to an embodiment of the present invention are structured such that the codebook factors of the precoding matrix to equalize the power ratios per layer.

As described above, the present invention proposes rank-3 precoding matrices for transmitting two codewords are transmitted through separate multiple antennas while maintaining the power per layer identically without increase of PAPR at each antenna in the MIMO system using 4 transmit antennas.

That is, the rank-3 precoding matrices according to the embodiment of the present invention allow protecting of an increase in the PAPR at each antenna and equalizing the power per layer. Since the precoding matrix is structured such that the individual codewords are transmitted through the same number of multiple antennas, each codeword can undergo a diversity effect by the multiple transmit antennas.

A description is made of the advantages of the use of the rank-3 codebook proposed in the present invention.

The rank-3 codebook according to an exemplary embodiment of the present invention can be classified as a Cubic Metric Preserving codebook (CMP) since it does not increase the PAPR at each antenna. Here, Cubic Metric (CM) is a term defined in the 3GPP standard specifications for efficiently representing the influence of the PAPR at a power amplifier. CMF denotes CM-friendly in the meaning that it does not preserve the CM but also does not greatly increase the CM. Nevertheless, the CMF increases the PAPR considerably as compared to the CMP.

The codebook of Table 3 can be referred to as a CMF codebook. Here, it is assumed that a precoding matrix (5) is selected from the CMF codebook of Table 3.

$$\frac{1}{2\sqrt{2}}\begin{bmatrix} 1 & -j & 0 \\ -j & -j & 0 \\ -j & 0 & 1 \\ -j & 0 & -j \end{bmatrix} \quad (5)$$

If the four antenna outputs are given by y1, y2, y3, and y4, the symbol data mapped to the layer 1 (Layer#1) is x1, the symbol data mapped to the layer 2 (Layer#2) is x2, and the symbol data mapped to the layer 3 (Layer#3) is x3, their relations can be expressed by Equation (6):

$$\begin{bmatrix} y1 \\ y2 \\ y3 \\ y4 \end{bmatrix} = \frac{1}{2\sqrt{2}}\begin{bmatrix} 1 & -j & 0 \\ -j & -j & 0 \\ -j & 0 & 1 \\ -j & 0 & -j \end{bmatrix}\begin{bmatrix} x1 \\ x2 \\ x3 \end{bmatrix} \quad (6)$$

In Equation (6), the output of the antenna 1 (Antenna#1) is expressed by $$y1 = \frac{1}{2\sqrt{2}}(x1 - jx2).$$

That is, the symbol data x1 mapped to the layer 1 (Layer#1) and the symbol data x2 mapped to the layer 2 (Layer#2), by the elements 1 and −j of the first row of the precoding matrix, are mixed to be output at the antenna 1 (Antenna#1), and this increases PAPR of the power amplifier of the antenna 1 (Antenna#1).

In the first to third embodiments of the present invention, the rank-3 precoding matrices proposed to solve the performance degradation problem at high SNR region is structured such that the PAPR does not increases at each antenna and per-layer power ratios are identical, as the precoding matrix (3).

Accordingly, the per-layer transmit power ratio imbalance problem of the conventional rank-3 precoding matrices is solved without an increase to the PAPR.

In the case where two codewords of the precoding matrix (3) are used, the precoding matrix is structured such that each codeword is mapped to two different antennas. Accordingly, each codeword can be transmitted with a transmit diversity effect. However, the structure of the precoding matrix (3) produces power ratios of the antennas that are unequal to each other.

This problem is explained with reference to following Equation (7):

$$\begin{bmatrix} y1 \\ y2 \\ y3 \\ y4 \end{bmatrix} = \frac{1}{\sqrt{3}}\begin{bmatrix} 1/\sqrt{2} & 0 & 0 \\ 0 & 1 & 0 \\ 0 & 0 & 1 \\ 1/\sqrt{2} & 0 & 0 \end{bmatrix}\begin{bmatrix} x1 \\ x2 \\ x3 \end{bmatrix} \quad (7)$$

where y1, y2, y3, and y4 denotes outputs of the four antennas, x1 denotes the symbol data mapped to the layer 1 (Layer#1), x2 denotes the symbol data mapped to the layer 2 (Layer#2), and x3 denotes the symbol data mapped to the layer 3 (Layer#3). In equation (7), the outputs of the antennas (Antenna#1, Antenna#2, Antenna#3, and Antenna#4) are expressed by $$y1 = \frac{1}{\sqrt{6}}x1, \; y2 = \frac{1}{\sqrt{3}}x2, \; y3 = \frac{1}{\sqrt{3}}x3, \text{ and } y4 = \frac{1}{\sqrt{6}}x1,$$

respectively. Since the powers of the symbol data x1, x2, and x3 are identical to each other, the power ratio of the antenna outputs y1, y2, y3, and y4 becomes 1:2:2:1.

In the case where the antenna output ratio of Equation (7) is out of balance, it is required for the antennas to use Power Amplifiers (PA) outputting different maxim powers or power amplifiers outputting identical power but having maximum output powers greater than those shown in the precoding matrix (4). For example, if the sum of the output powers of all the antennas in the precoding matrix (4) is 23 dBm, each antenna is required to use a power amplifier having a maximum power of 17 dBM. This is because 17 dBm+17 dBm+17 dBm+17 dBm=23 dBm.

In order to make the sum of all the antennas' outputs equal to 23 dBm in Equation (7), it is possible to used a PA having a maximum output of 17 dBm for the first and fourth antennas' to output y1 and y4 and the PA having the maximum output of 20 dBm for the second and third antennas' to output y2 and y3.

Even though the power amplifiers having the maximum output of 17 dBm are used for y1 and y4, the antenna outputs y1 and y4 do not reach 17 dBm; and even though the power amplifiers having the maximum output for 20 dBm are used for y2 and y3, the antenna outputs y2 and y3 do not reach 20 dBm; and thus it is possible to make the sum of the powers of all the antennas 23 dBm.

Another approach to make the sum of the outputs of all the antennas' equal to 23 dBm in Equation (7) is to use power amplifiers having a maximum output of 20 dBm for all of y1, y2, y3, and y4. In this case, the y2 and y3 are output by using the 20 dBm power amplifiers rather than 17 dBm power amplifiers.

The precoding matrix in Equation (7) shows a low efficiency, since the power amplifiers do not operate at their maximum output powers, but high performance in the high SNR region as compared to the precoding matrix (4).

This is because an equal power ratio among layers of the precoding matrix of Equation (7) that are maintained from middle to high SNR improves the performance degradation caused by the power ratio imbalance among the layers.

This is because the performance degradation caused by the power ratio imbalance among the layers is solved by equalizing power ratio among layers of the precoding matrix of Equation (7) that are maintained from intermediate to high SNR.

The precoding matrix having equal power ratios between antennas is superior to the precoding matrix of Equation (7) in performance from the low SNR region to the intermediate SNR region. That is, according to the SNR region, performance superiority is shown by the precoding matrix maintaining an equal inter-antenna power ratio or the precoding matrix of Equation (7) maintaining an equal inter-layer power ratio.

A description is made of the transmission method and apparatus using a codebook having the advantages of both the precoding matrices directed to identical inter-layer power ratio and the precoding matrices directed to identical inter-antenna power ratio according to fourth and fifth embodiments of the present invention.

Fourth Embodiment

A fourth embodiment is directed to a structure of precoding matrices with which two codewords are mapped to two different antennas while maintaining equal power ratio among layers or antennas without an increase in the PAPR at the individual antennas.

Table 11 shows a codebook consisted of precoding matrices in which the power ratios between the layers are identical and the precoding matrices in which the power ratios between antennas are identical. As shown in Table 11, the fourth embodiment is directed to the system using 4 antennas and rank-3 precoding matrices. In the case where multiple codebooks are input, the codebooks are mapped to different antennas.

Prior to the explanation of the fourth embodiment, it is noted that the base codebooks are generated for the codebook presented in Table 10. In order to generate the codebook of Table 10, it is assumed that the codebook of the precoding matrices having identical power ratios between layers is the same as Table 4.

As aforementioned, Table 5 shows the normalized form of the precoding matrices of the codebook of Table 4.

Also, Table 6 is a code book in which the rows of the precoding matrices of the codebook of Table 4 are permutated.

Table 6 shows one of twelve available codebooks that can be obtained by performing row permutation on the codebook of Table 4. By permuting the second and fourth rows of the precoding matrices of the codebook of Table 4, the codebook of Table 6 is generated. By performing the row permutation, 12 different codebooks can be generated from the codebook of Table 4.

Table 8 shows the precoding matrices generated by adjusting the factor values of the elements of the first rows of the precoding matrices of the codebook of Table 4 such that the power ratios between antennas are equal to each other.

TABLE 8

$$\begin{bmatrix} 1 & 0 & 0 \\ 0 & 1 & 0 \\ 1 & 0 & 0 \\ 0 & 0 & 1 \end{bmatrix} \begin{bmatrix} 0 & 1 & 0 \\ 1 & 0 & 0 \\ 0 & 0 & 1 \\ 1 & 0 & 0 \end{bmatrix} \begin{bmatrix} 1 & 0 & 0 \\ 1 & 0 & 0 \\ 0 & 1 & 0 \\ 0 & 0 & 1 \end{bmatrix} \begin{bmatrix} 0 & 1 & 0 \\ 0 & 0 & 1 \\ 1 & 0 & 0 \\ 1 & 0 & 0 \end{bmatrix}$$

$$\begin{bmatrix} 1 & 0 & 0 \\ 0 & 1 & 0 \\ -1 & 0 & 0 \\ 0 & 0 & 1 \end{bmatrix} \begin{bmatrix} 0 & 1 & 0 \\ 1 & 0 & 0 \\ 0 & 0 & 1 \\ -1 & 0 & 0 \end{bmatrix} \begin{bmatrix} 1 & 0 & 0 \\ -1 & 0 & 0 \\ 0 & 1 & 0 \\ 0 & 0 & 1 \end{bmatrix} \begin{bmatrix} 0 & 1 & 0 \\ 0 & 0 & 1 \\ 1 & 0 & 0 \\ -1 & 0 & 0 \end{bmatrix}$$

$$\begin{bmatrix} 1 & 0 & 0 \\ 0 & 1 & 0 \\ j & 0 & 0 \\ 0 & 0 & 1 \end{bmatrix} \begin{bmatrix} 0 & 1 & 0 \\ 1 & 0 & 0 \\ 0 & 0 & 1 \\ j & 0 & 0 \end{bmatrix} \begin{bmatrix} 1 & 0 & 0 \\ j & 0 & 0 \\ 0 & 1 & 0 \\ 0 & 0 & 1 \end{bmatrix} \begin{bmatrix} 0 & 1 & 0 \\ 0 & 0 & 1 \\ 1 & 0 & 0 \\ j & 0 & 0 \end{bmatrix}$$

$$\begin{bmatrix} 1 & 0 & 0 \\ 0 & 1 & 0 \\ -j & 0 & 0 \\ 0 & 0 & 1 \end{bmatrix} \begin{bmatrix} 0 & 1 & 0 \\ 1 & 0 & 0 \\ 0 & 0 & 1 \\ -j & 0 & 0 \end{bmatrix} \begin{bmatrix} 1 & 0 & 0 \\ -j & 0 & 0 \\ 0 & 1 & 0 \\ 0 & 0 & 1 \end{bmatrix} \begin{bmatrix} 0 & 1 & 0 \\ 0 & 0 & 1 \\ 1 & 0 & 0 \\ -j & 0 & 0 \end{bmatrix}$$

Table 9 shows the normalized precoding matrices of the codebook of Table 8.

TABLE 9

$$\frac{1}{2}\begin{bmatrix} 1 & 0 & 0 \\ 0 & 1 & 0 \\ 1 & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ 1 & 0 & 0 \end{bmatrix} \quad \frac{1}{2}\begin{bmatrix} 1 & 0 & 0 \\ 1 & 0 & 0 \\ 0 & 1 & 0 \\ 0 & 0 & 1 \end{bmatrix}$$

$$\frac{1}{2}\begin{bmatrix} 0 & 1 & 0 \\ 0 & 0 & 1 \\ 1 & 0 & 0 \\ 1 & 0 & 0 \end{bmatrix} \quad \frac{1}{2}\begin{bmatrix} 1 & 0 & 0 \\ 0 & 1 & 0 \\ -1 & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ -1 & 0 & 0 \end{bmatrix}$$

$$\frac{1}{2}\begin{bmatrix} 1 & 0 & 0 \\ -1 & 0 & 0 \\ 0 & 1 & 0 \\ 0 & 0 & 1 \end{bmatrix} \quad \frac{1}{2}\begin{bmatrix} 0 & 1 & 0 \\ 0 & 0 & 1 \\ 1 & 0 & 0 \\ -1 & 0 & 0 \end{bmatrix} \quad \frac{1}{2}\begin{bmatrix} 1 & 0 & 0 \\ 0 & 1 & 0 \\ j & 0 & 0 \\ 0 & 0 & 1 \end{bmatrix}$$

$$\frac{1}{2}\begin{bmatrix} 0 & 1 & 0 \\ 1 & 0 & 0 \\ 0 & 0 & 1 \\ j & 0 & 0 \end{bmatrix} \quad \frac{1}{2}\begin{bmatrix} 1 & 0 & 0 \\ j & 0 & 0 \\ 0 & 1 & 0 \\ 0 & 0 & 1 \end{bmatrix} \quad \frac{1}{2}\begin{bmatrix} 0 & 1 & 0 \\ 0 & 0 & 1 \\ 1 & 0 & 0 \\ j & 0 & 0 \end{bmatrix}$$

$$\frac{1}{2}\begin{bmatrix} 1 & 0 & 0 \\ 0 & 1 & 0 \\ -j & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ -j & 0 & 0 \end{bmatrix} \quad \frac{1}{2}\begin{bmatrix} 1 & 0 & 0 \\ -j & 0 & 0 \\ 0 & 1 & 0 \\ 0 & 0 & 1 \end{bmatrix}$$

$$\frac{1}{2}\begin{bmatrix} 0 & 1 & 0 \\ 0 & 0 & 1 \\ 1 & 0 & 0 \\ -j & 0 & 0 \end{bmatrix}$$

Table 10 shows a codebook consisted of the precoding matrices from table 4 in which the power ratios between layers are equal to each other and the precoding matrices from Table 8 in which the power ratios between antennas are equal to each other according to the fourth embodiment of the present invention.

TABLE 10

$$\begin{bmatrix} 1 & 0 & 0 \\ 0 & 1 & 0 \\ 1 & 0 & 0 \\ 0 & 0 & 1 \end{bmatrix} \quad \begin{bmatrix} 0 & 1 & 0 \\ 1 & 0 & 0 \\ 0 & 0 & 1 \\ 1 & 0 & 0 \end{bmatrix} \quad \begin{bmatrix} 1 & 0 & 0 \\ 1 & 0 & 0 \\ 0 & 1 & 0 \\ 0 & 0 & 1 \end{bmatrix}$$

$$\begin{bmatrix} 0 & 1 & 0 \\ 0 & 0 & 1 \\ 1 & 0 & 0 \\ 1 & 0 & 0 \end{bmatrix} \quad \begin{bmatrix} 1 & 0 & 0 \\ 0 & 1 & 0 \\ -1 & 0 & 0 \\ 0 & 0 & 1 \end{bmatrix} \quad \begin{bmatrix} 0 & 1 & 0 \\ 1 & 0 & 0 \\ 0 & 0 & 1 \\ -1 & 0 & 0 \end{bmatrix}$$

$$\begin{bmatrix} 1 & 0 & 0 \\ -1 & 0 & 0 \\ 0 & 1 & 0 \\ 0 & 0 & 1 \end{bmatrix} \quad \begin{bmatrix} 0 & 1 & 0 \\ 0 & 0 & 1 \\ 1 & 0 & 0 \\ -1 & 0 & 0 \end{bmatrix} \quad \begin{bmatrix} 1/\sqrt{2} & 0 & 0 \\ 0 & 1 & 0 \\ 1/\sqrt{2} & 0 & 0 \\ 0 & 0 & 1 \end{bmatrix}$$

$$\begin{bmatrix} 0 & 1 & 0 \\ 1/\sqrt{2} & 0 & 0 \\ 0 & 0 & 1 \\ 1/\sqrt{2} & 0 & 0 \end{bmatrix} \quad \begin{bmatrix} 1/\sqrt{2} & 0 & 0 \\ 1/\sqrt{2}j & 0 & 0 \\ 0 & 1 & 0 \\ 0 & 0 & 1 \end{bmatrix} \quad \begin{bmatrix} 0 & 1 & 0 \\ 0 & 0 & 1 \\ 1/\sqrt{2} & 0 & 0 \\ 1/\sqrt{2}j & 0 & 0 \end{bmatrix}$$

TABLE 10-continued $$\begin{bmatrix} 1/\sqrt{2} & 0 & 0 \\ 0 & 1 & 0 \\ -1/\sqrt{2} & 0 & 0 \\ 0 & 0 & 1 \end{bmatrix} \quad \begin{bmatrix} 0 & 1 & 0 \\ 1/\sqrt{2} & 0 & 0 \\ 0 & 0 & 1 \\ -1/\sqrt{2}j & 0 & 0 \end{bmatrix} \quad \begin{bmatrix} 1/\sqrt{2} & 0 & 0 \\ -1/\sqrt{2}j & 0 & 0 \\ 0 & 1 & 0 \\ 0 & 0 & 1 \end{bmatrix}$$

$$\begin{bmatrix} 0 & 1 & 0 \\ 0 & 0 & 1 \\ 1/\sqrt{2} & 0 & 0 \\ -1/\sqrt{2}j & 0 & 0 \end{bmatrix}$$

Table 11 shows a codebook consisted of the normalized precoding matrices of Table 10 according to the fourth embodiment of the present invention.

TABLE 11

$$\frac{1}{2}\begin{bmatrix} 1 & 0 & 0 \\ 0 & 1 & 0 \\ 1 & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ 1 & 0 & 0 \end{bmatrix}$$

$$\frac{1}{2}\begin{bmatrix} 1 & 0 & 0 \\ 1 & 0 & 0 \\ 0 & 1 & 0 \\ 0 & 0 & 1 \end{bmatrix} \quad \frac{1}{2}\begin{bmatrix} 0 & 1 & 0 \\ 0 & 0 & 1 \\ 1 & 0 & 0 \\ 1 & 0 & 0 \end{bmatrix}$$

$$\frac{1}{2}\begin{bmatrix} 1 & 0 & 0 \\ 0 & 1 & 0 \\ -1 & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ -1 & 0 & 0 \end{bmatrix}$$

$$\frac{1}{2}\begin{bmatrix} 1 & 0 & 0 \\ -1 & 0 & 0 \\ 0 & 1 & 0 \\ 0 & 0 & 1 \end{bmatrix} \quad \frac{1}{2}\begin{bmatrix} 0 & 1 & 0 \\ 0 & 0 & 1 \\ 1 & 0 & 0 \\ -1 & 0 & 0 \end{bmatrix}$$

$$\frac{1}{\sqrt{3}}\begin{bmatrix} 1/\sqrt{2} & 0 & 0 \\ 0 & 1 & 0 \\ 1/\sqrt{2}j & 0 & 0 \\ 0 & 0 & 1 \end{bmatrix} \quad \frac{1}{\sqrt{3}}\begin{bmatrix} 0 & 1 & 0 \\ 1/\sqrt{2} & 0 & 0 \\ 0 & 0 & 1 \\ 1/\sqrt{2}j & 0 & 0 \end{bmatrix}$$

$$\frac{1}{\sqrt{3}}\begin{bmatrix} 1/\sqrt{2} & 0 & 0 \\ 1/\sqrt{2}j & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ 1/\sqrt{2}j & 0 & 0 \end{bmatrix}$$

$$\frac{1}{\sqrt{3}}\begin{bmatrix} 1/\sqrt{2} & 0 & 0 \\ 0 & 1 & 0 \\ -1/\sqrt{2}j & 0 & 0 \\ 0 & 0 & 1 \end{bmatrix} \quad \frac{1}{\sqrt{3}}\begin{bmatrix} 0 & 1 & 0 \\ 1/\sqrt{2} & 0 & 0 \\ 0 & 0 & 1 \\ -1/\sqrt{2}j & 0 & 0 \end{bmatrix}$$

$$\frac{1}{\sqrt{3}}\begin{bmatrix} 1/\sqrt{2} & 0 & 0 \\ -1/\sqrt{2}j & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ -1/\sqrt{2}j & 0 & 0 \end{bmatrix}$$

Table 12 shows a codebook consisted of the precoding matrices according to the fourth embodiment of the present invention.

TABLE 12

$$\frac{1}{2}\begin{bmatrix}1&0&0\\0&1&0\\1&0&0\\0&0&1\end{bmatrix} \quad \frac{1}{2}\begin{bmatrix}0&1&0\\1&0&0\\0&0&1\\1&0&0\end{bmatrix} \quad \frac{1}{\sqrt{3}}\begin{bmatrix}1/\sqrt{2}&0&0\\1/\sqrt{2}&0&0\\0&1&0\\0&0&1\end{bmatrix} \quad \frac{1}{\sqrt{3}}\begin{bmatrix}0&1&0\\0&0&1\\1/\sqrt{2}&0&0\\1/\sqrt{2}&0&0\end{bmatrix}$$

$$\frac{1}{2}\begin{bmatrix}1&0&0\\0&1&0\\-1&0&0\\0&0&1\end{bmatrix} \quad \frac{1}{2}\begin{bmatrix}0&1&0\\1&0&0\\0&0&1\\-1&0&0\end{bmatrix} \quad \frac{1}{\sqrt{3}}\begin{bmatrix}1/\sqrt{2}&0&0\\0&1&0\\-1\sqrt{2}&0&0\\0&0&1\end{bmatrix} \quad \frac{1}{\sqrt{3}}\begin{bmatrix}0&1&0\\1/\sqrt{2}&0&0\\0&0&1\\-1\sqrt{2}&0&0\end{bmatrix}$$

$$\frac{1}{2}\begin{bmatrix}1&0&0\\0&1&0\\j&0&0\\0&0&1\end{bmatrix} \quad \frac{1}{2}\begin{bmatrix}0&1&0\\1&0&0\\0&0&1\\j&0&0\end{bmatrix} \quad \frac{1}{\sqrt{3}}\begin{bmatrix}1/\sqrt{2}&0&0\\1/\sqrt{2}j&0&0\\0&1&0\\0&0&1\end{bmatrix} \quad \frac{1}{\sqrt{3}}\begin{bmatrix}0&1&0\\0&0&1\\1/\sqrt{2}&0&0\\1/\sqrt{2}j&0&0\end{bmatrix}$$

$$\frac{1}{2}\begin{bmatrix}1&0&0\\0&1&0\\-j&0&0\\0&0&1\end{bmatrix} \quad \frac{1}{2}\begin{bmatrix}0&1&0\\1&0&0\\0&0&1\\-j&0&0\end{bmatrix} \quad \frac{1}{\sqrt{3}}\begin{bmatrix}1/\sqrt{2}&0&0\\0&1&0\\-1/\sqrt{2}&0&0\\0&0&1\end{bmatrix} \quad \frac{1}{\sqrt{3}}\begin{bmatrix}0&1&0\\1/\sqrt{2}&0&0\\0&0&1\\-1/\sqrt{2}j&0&0\end{bmatrix}$$

Table 13 shows another codebook consisted of the preceding matrices according to the fourth embodiment of the present invention.

TABLE 13

$$\frac{1}{2}\begin{bmatrix}1&0&0\\0&1&0\\1&0&0\\0&0&1\end{bmatrix} \quad \frac{1}{2}\begin{bmatrix}0&1&0\\1&0&0\\0&0&1\\1&0&0\end{bmatrix} \quad \frac{1}{\sqrt{3}}\begin{bmatrix}1/\sqrt{2}&0&0\\1/\sqrt{2}&0&0\\0&1&0\\0&0&1\end{bmatrix} \quad \frac{1}{\sqrt{3}}\begin{bmatrix}0&1&0\\0&0&1\\1/\sqrt{2}&0&0\\1/\sqrt{2}&0&0\end{bmatrix}$$

$$\frac{1}{\sqrt{3}}\begin{bmatrix}1/\sqrt{2}&0&0\\0&1&0\\-1/\sqrt{2}&0&0\\0&0&1\end{bmatrix} \quad \frac{1}{\sqrt{3}}\begin{bmatrix}0&1&0\\1/\sqrt{2}&0&0\\0&0&1\\-1/\sqrt{2}&0&0\end{bmatrix} \quad \frac{1}{2}\begin{bmatrix}1&0&0\\-1&0&0\\0&1&0\\0&0&1\end{bmatrix} \quad \frac{1}{2}\begin{bmatrix}0&1&0\\0&0&1\\1&0&0\\-1&0&0\end{bmatrix}$$

$$\frac{1}{2}\begin{bmatrix}1&0&0\\0&1&0\\j&0&0\\0&0&1\end{bmatrix} \quad \frac{1}{2}\begin{bmatrix}0&1&0\\1&0&0\\0&0&1\\j&0&0\end{bmatrix} \quad \frac{1}{\sqrt{3}}\begin{bmatrix}1/\sqrt{2}&0&0\\1/\sqrt{2}j&0&0\\0&1&0\\0&0&1\end{bmatrix} \quad \frac{1}{\sqrt{3}}\begin{bmatrix}0&1&0\\0&0&1\\1/\sqrt{2}&0&0\\1/\sqrt{2}j&0&0\end{bmatrix}$$

$$\frac{1}{\sqrt{3}}\begin{bmatrix}1/\sqrt{2}&0&0\\0&1&0\\-1/\sqrt{2}j&0&0\\0&0&1\end{bmatrix} \quad \frac{1}{\sqrt{3}}\begin{bmatrix}0&1&0\\1/\sqrt{2}&0&0\\0&0&1\\-1/\sqrt{2}j&0&0\end{bmatrix} \quad \frac{1}{2}\begin{bmatrix}1&0&0\\-j&0&0\\0&1&0\\0&0&1\end{bmatrix} \quad \frac{1}{2}\begin{bmatrix}0&1&0\\0&0&1\\1&0&0\\-j&0&0\end{bmatrix}$$

In case of using the 16 preceding matrices of Table 12 or Table 13, if the transmit power is unlimited, one of the following two methods can be used.

The first method is to use 16 precoding matrices consisted of 8 precoding matrices that equalize the power ratios between layers and 8 precoding matrices that equalize the power ratios between antennas, and the second method is to use 8 precoding matrices that equalize the power ratios between layers.

The 8 precoding matrices that equalize the power ratios between layers in Table 12 and Table 13 are shown separately in Table 14 and Table 15.

TABLE 14

$$\frac{1}{\sqrt{3}}\begin{bmatrix} 1/\sqrt{2} & 0 & 0 \\ 1/\sqrt{2} & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ 1/\sqrt{2} & 0 & 0 \end{bmatrix}$$

$$\frac{1}{\sqrt{3}}\begin{bmatrix} 1/\sqrt{2} & 0 & 0 \\ 0 & 1 & 0 \\ -1/\sqrt{2} & 0 & 0 \\ 0 & 0 & 1 \end{bmatrix} \quad \frac{1}{\sqrt{3}}\begin{bmatrix} 0 & 1 & 0 \\ 1/\sqrt{2} & 0 & 0 \\ 0 & 0 & 1 \\ -1/\sqrt{2} & 0 & 0 \end{bmatrix}$$

$$\frac{1}{\sqrt{3}}\begin{bmatrix} 1/\sqrt{2} & 0 & 0 \\ 1/\sqrt{2}j & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ 1/\sqrt{2}j & 0 & 0 \end{bmatrix}$$

$$\frac{1}{\sqrt{3}}\begin{bmatrix} 1/\sqrt{2} & 0 & 0 \\ 0 & 1 & 0 \\ -1/\sqrt{2}j & 0 & 0 \\ 0 & 0 & 1 \end{bmatrix} \quad \frac{1}{\sqrt{3}}\begin{bmatrix} 0 & 1 & 0 \\ 1/\sqrt{2} & 0 & 0 \\ 0 & 0 & 1 \\ -1/\sqrt{2}j & 0 & 0 \end{bmatrix}$$

TABLE 15

$$\frac{1}{\sqrt{3}}\begin{bmatrix} 1/\sqrt{2} & 0 & 0 \\ 1/\sqrt{2} & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ 1/\sqrt{2} & 0 & 0 \end{bmatrix}$$

$$\frac{1}{\sqrt{3}}\begin{bmatrix} 1/\sqrt{2} & 0 & 0 \\ 0 & 1 & 0 \\ -1/\sqrt{2} & 0 & 0 \\ 0 & 0 & 1 \end{bmatrix} \quad \frac{1}{\sqrt{3}}\begin{bmatrix} 0 & 1 & 0 \\ 1/\sqrt{2} & 0 & 0 \\ 0 & 0 & 1 \\ -1/\sqrt{2} & 0 & 0 \end{bmatrix}$$

$$\frac{1}{\sqrt{3}}\begin{bmatrix} 1/\sqrt{2} & 0 & 0 \\ 1/\sqrt{2}j & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ 1/\sqrt{2}j & 0 & 0 \end{bmatrix}$$

$$\frac{1}{\sqrt{3}}\begin{bmatrix} 1/\sqrt{2} & 0 & 0 \\ 0 & 1 & 0 \\ -1/\sqrt{2}j & 0 & 0 \\ 0 & 0 & 1 \end{bmatrix} \quad \frac{1}{\sqrt{3}}\begin{bmatrix} 0 & 1 & 0 \\ 1/\sqrt{2} & 0 & 0 \\ 0 & 0 & 1 \\ -1/\sqrt{2}j & 0 & 0 \end{bmatrix}$$

Table 14 shows the eight precoding matrices of Table 12 that equalize the power ratios between the layers, and Table 15 shows the eight precoding matrices of Table 13 that equalize the power ratios between the layers.

It the transmit powers of the antennas are limited, the eight precoding matrices of Table 12 or Table 13 that equalize the power ratios between antennas are used. These 8 precoding matrices are shown in Table 16 and Table 17.

TABLE 16

$$\frac{1}{2}\begin{bmatrix} 1 & 0 & 0 \\ 0 & 1 & 0 \\ 1 & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ 1 & 0 & 0 \end{bmatrix}$$

$$\frac{1}{2}\begin{bmatrix} 1 & 0 & 0 \\ 0 & 1 & 0 \\ -1 & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ -1 & 0 & 0 \end{bmatrix}$$

TABLE 16-continued $$\frac{1}{2}\begin{bmatrix} 1 & 0 & 0 \\ 0 & 1 & 0 \\ j & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ j & 0 & 0 \end{bmatrix}$$

$$\frac{1}{2}\begin{bmatrix} 1 & 0 & 0 \\ 0 & 1 & 0 \\ -j & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ -j & 0 & 0 \end{bmatrix}$$

TABLE 17

$$\frac{1}{2}\begin{bmatrix} 1 & 0 & 0 \\ 0 & 1 & 0 \\ 1 & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ 1 & 0 & 0 \end{bmatrix}$$

$$\frac{1}{2}\begin{bmatrix} 1 & 0 & 0 \\ -1 & 0 & 0 \\ 0 & 1 & 0 \\ 0 & 0 & 1 \end{bmatrix} \quad \frac{1}{2}\begin{bmatrix} 0 & 1 & 0 \\ 0 & 0 & 1 \\ 1 & 0 & 0 \\ -1 & 0 & 0 \end{bmatrix}$$

$$\frac{1}{2}\begin{bmatrix} 1 & 0 & 0 \\ 0 & 1 & 0 \\ j & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ j & 0 & 0 \end{bmatrix}$$

TABLE 17-continued $$\frac{1}{2}\begin{bmatrix} 1 & 0 & 0 \\ -j & 0 & 0 \\ 0 & 1 & 0 \\ 0 & 0 & 1 \end{bmatrix} \quad \frac{1}{2}\begin{bmatrix} 0 & 1 & 0 \\ 0 & 0 & 1 \\ 1 & 0 & 0 \\ -j & 0 & 0 \end{bmatrix}$$

Table 16 shows the eight precoding matrices of Table 12 that equalize the transmit power ratios between antennasI, and Table 17 shows the eight precoding matrices of Table 13 that equalize the transmit power ratios between antennas.

Table 18 shows another example of precoding matrices according to the fourth embodiment of the present invention.

TABLE 18

$$\frac{1}{\sqrt{3}}\begin{bmatrix} 1/\sqrt{2} & 0 & 0 \\ 0 & 0 & 1 \\ 1/\sqrt{2} & 0 & 0 \\ 0 & 1 & 0 \end{bmatrix} \quad \frac{1}{\sqrt{3}}\begin{bmatrix} 1/\sqrt{2} & 0 & 0 \\ 0 & 0 & 1 \\ -1/\sqrt{2} & 0 & 0 \\ 0 & 1 & 0 \end{bmatrix} \quad \frac{1}{\sqrt{3}}\begin{bmatrix} 1/\sqrt{2} & 0 & 0 \\ 0 & 0 & 1 \\ 1/\sqrt{2}j & 0 & 0 \\ 0 & 1 & 0 \end{bmatrix} \quad \frac{1}{\sqrt{3}}\begin{bmatrix} 1/\sqrt{2} & 0 & 0 \\ 0 & 0 & 1 \\ -1/\sqrt{2}j & 0 & 0 \\ 0 & 1 & 0 \end{bmatrix}$$

$$\frac{1}{\sqrt{3}}\begin{bmatrix} 0 & 0 & 1 \\ 1/\sqrt{2} & 0 & 0 \\ 0 & 1 & 0 \\ 1/\sqrt{2} & 0 & 0 \end{bmatrix} \quad \frac{1}{\sqrt{3}}\begin{bmatrix} 0 & 0 & 1 \\ 1/\sqrt{2} & 0 & 0 \\ 0 & 1 & 0 \\ -1/\sqrt{2} & 0 & 0 \end{bmatrix} \quad \frac{1}{\sqrt{3}}\begin{bmatrix} 0 & 0 & 1 \\ 1/\sqrt{2} & 0 & 0 \\ 0 & 1 & 0 \\ 1/\sqrt{2}j & 0 & 0 \end{bmatrix} \quad \frac{1}{\sqrt{3}}\begin{bmatrix} 0 & 0 & 1 \\ 1/\sqrt{2} & 0 & 0 \\ 0 & 1 & 0 \\ -1\sqrt{2}j & 0 & 0 \end{bmatrix}$$

$$\frac{1}{\sqrt{3}}\begin{bmatrix} 1/\sqrt{2} & 0 & 0 \\ 1/\sqrt{2} & 0 & 0 \\ 0 & 0 & 1 \\ 0 & 1 & 0 \end{bmatrix} \quad \frac{1}{\sqrt{3}}\begin{bmatrix} 1/\sqrt{2} & 0 & 0 \\ -1/\sqrt{2} & 0 & 0 \\ 0 & 0 & 1 \\ 0 & 1 & 0 \end{bmatrix} \quad \frac{1}{\sqrt{3}}\begin{bmatrix} 0 & 0 & 1 \\ 0 & 1 & 0 \\ 1/\sqrt{2} & 0 & 0 \\ 1/\sqrt{2} & 0 & 0 \end{bmatrix} \quad \frac{1}{\sqrt{3}}\begin{bmatrix} 0 & 0 & 1 \\ 0 & 1 & 0 \\ 1/\sqrt{2} & 0 & 0 \\ -1/\sqrt{2} & 0 & 0 \end{bmatrix}$$

$$\frac{1}{2}\begin{bmatrix} 1 & 0 & 0 \\ 0 & 0 & 1 \\ 1 & 0 & 0 \\ 0 & 1 & 0 \end{bmatrix} \quad \frac{1}{2}\begin{bmatrix} 1 & 0 & 0 \\ 0 & 0 & 1 \\ -1 & 0 & 0 \\ 0 & 1 & 0 \end{bmatrix} \quad \frac{1}{2}\begin{bmatrix} 1 & 0 & 0 \\ 0 & 0 & 1 \\ j & 0 & 0 \\ 0 & 1 & 0 \end{bmatrix} \quad \frac{1}{2}\begin{bmatrix} 1 & 0 & 0 \\ 0 & 0 & 1 \\ -j & 0 & 0 \\ 0 & 1 & 0 \end{bmatrix}$$

$$\frac{1}{2}\begin{bmatrix} 0 & 0 & 1 \\ 1 & 0 & 0 \\ 0 & 1 & 0 \\ 1 & 0 & 0 \end{bmatrix} \quad \frac{1}{2}\begin{bmatrix} 0 & 0 & 1 \\ 1 & 0 & 0 \\ 0 & 1 & 0 \\ -1 & 0 & 0 \end{bmatrix} \quad \frac{1}{2}\begin{bmatrix} 0 & 0 & 1 \\ 1 & 0 & 0 \\ 0 & 1 & 0 \\ j & 0 & 0 \end{bmatrix} \quad \frac{1}{2}\begin{bmatrix} 0 & 0 & 1 \\ 1 & 0 & 0 \\ 0 & 1 & 0 \\ -j & 0 & 0 \end{bmatrix}$$

As shown in Table 18, another codebook according to the fourth embodiment of the present invention includes 20 precoding matrices.

In the case where the transmitted power is unlimited, two methods are used.

The first method is to use all 20 precoding matrices of Table 18 including 12 precoding matrices that equalize the power ratios between layers and 8 precoding matrices that equalize the power ratios between the power ratios between antennas, and the second method is to use only the 12 precoding matrices of the Table 18 that equalize the power ratios between layers.

The 12 precoding matrices, in Table 18, that equalize the power ratios between the layers are separately shown in Table 19.

TABLE 19

$$\frac{1}{\sqrt{3}}\begin{bmatrix} 1/\sqrt{2} & 0 & 0 \\ 0 & 0 & 1 \\ 1/\sqrt{2} & 0 & 0 \\ 0 & 1 & 0 \end{bmatrix} \quad \frac{1}{\sqrt{3}}\begin{bmatrix} 1/\sqrt{2} & 0 & 0 \\ 0 & 0 & 1 \\ -1/\sqrt{2} & 0 & 0 \\ 0 & 1 & 0 \end{bmatrix} \quad \frac{1}{\sqrt{3}}\begin{bmatrix} 1/\sqrt{2} & 0 & 0 \\ 0 & 0 & 1 \\ 1/\sqrt{2}j & 0 & 0 \\ 0 & 1 & 0 \end{bmatrix} \quad \frac{1}{\sqrt{3}}\begin{bmatrix} 1/\sqrt{2} & 0 & 0 \\ 0 & 0 & 1 \\ -1/\sqrt{2}j & 0 & 0 \\ 0 & 1 & 0 \end{bmatrix}$$

$$\frac{1}{\sqrt{3}}\begin{bmatrix} 0 & 0 & 1 \\ 1/\sqrt{2} & 0 & 0 \\ 0 & 1 & 0 \\ 1/\sqrt{2} & 0 & 0 \end{bmatrix} \quad \frac{1}{\sqrt{3}}\begin{bmatrix} 0 & 0 & 1 \\ 1/\sqrt{2} & 0 & 0 \\ 0 & 1 & 0 \\ -1/\sqrt{2} & 0 & 0 \end{bmatrix} \quad \frac{1}{\sqrt{3}}\begin{bmatrix} 0 & 0 & 1 \\ 1/\sqrt{2} & 0 & 0 \\ 0 & 1 & 0 \\ 1/\sqrt{2}j & 0 & 0 \end{bmatrix} \quad \frac{1}{\sqrt{3}}\begin{bmatrix} 0 & 0 & 1 \\ 1/\sqrt{2} & 0 & 0 \\ 0 & 1 & 0 \\ -1/\sqrt{2}j & 0 & 0 \end{bmatrix}$$

$$\frac{1}{\sqrt{3}}\begin{bmatrix} 1/\sqrt{2} & 0 & 0 \\ 1/\sqrt{2} & 0 & 0 \\ 0 & 0 & 1 \\ 0 & 1 & 0 \end{bmatrix} \quad \frac{1}{\sqrt{3}}\begin{bmatrix} 1/\sqrt{2} & 0 & 0 \\ -1/\sqrt{2} & 0 & 0 \\ 0 & 0 & 1 \\ 0 & 1 & 0 \end{bmatrix} \quad \frac{1}{\sqrt{3}}\begin{bmatrix} 0 & 0 & 1 \\ 0 & 1 & 0 \\ 1/\sqrt{2} & 0 & 0 \\ 1/\sqrt{2} & 0 & 0 \end{bmatrix} \quad \frac{1}{\sqrt{3}}\begin{bmatrix} 0 & 0 & 1 \\ 0 & 1 & 0 \\ 1/\sqrt{2} & 0 & 0 \\ -1/\sqrt{2} & 0 & 0 \end{bmatrix}$$

In the case where the transmit power is limited, however, the 8 precoding matrices of Table 18 that equalize the transmit power ratios between antennas are used. The 8 precoding matrices that equalize the power ratios between antennas are separately shown in Table 20.

TABLE 20

$$\frac{1}{2}\begin{bmatrix} 1 & 0 & 0 \\ 0 & 0 & 1 \\ 1 & 0 & 0 \\ 0 & 1 & 0 \end{bmatrix} \quad \frac{1}{2}\begin{bmatrix} 1 & 0 & 0 \\ 0 & 0 & 1 \\ -1 & 0 & 0 \\ 0 & 1 & 0 \end{bmatrix} \quad \frac{1}{2}\begin{bmatrix} 1 & 0 & 0 \\ 0 & 0 & 1 \\ j & 0 & 0 \\ 0 & 1 & 0 \end{bmatrix} \quad \frac{1}{2}\begin{bmatrix} 1 & 0 & 0 \\ 0 & 0 & 1 \\ -j & 0 & 0 \\ 0 & 1 & 0 \end{bmatrix}$$

TABLE 20-continued $$\frac{1}{2}\begin{bmatrix} 0 & 0 & 1 \\ 1 & 0 & 0 \\ 0 & 1 & 0 \\ 1 & 0 & 0 \end{bmatrix} \quad \frac{1}{2}\begin{bmatrix} 0 & 0 & 1 \\ 1 & 0 & 0 \\ 0 & 1 & 0 \\ -1 & 0 & 0 \end{bmatrix} \quad \frac{1}{2}\begin{bmatrix} 0 & 0 & 1 \\ 1 & 0 & 0 \\ 0 & 1 & 0 \\ j & 0 & 0 \end{bmatrix} \quad \frac{1}{2}\begin{bmatrix} 0 & 0 & 1 \\ 1 & 0 & 0 \\ 0 & 1 & 0 \\ -j & 0 & 0 \end{bmatrix}$$

Also, the 20 precoding matrices that equalize the power ratios between the layers are separately shown in Table 21.

TABLE 21

$$\frac{1}{\sqrt{3}}\begin{bmatrix} 1/\sqrt{2} & 0 & 0 \\ 0 & 0 & 1 \\ 1/\sqrt{2} & 0 & 0 \\ 0 & 1 & 0 \end{bmatrix} \quad \frac{1}{\sqrt{3}}\begin{bmatrix} 1/\sqrt{2} & 0 & 0 \\ 0 & 0 & 1 \\ -1/\sqrt{2} & 0 & 0 \\ 0 & 1 & 0 \end{bmatrix} \quad \frac{1}{\sqrt{3}}\begin{bmatrix} 1/\sqrt{2} & 0 & 0 \\ 0 & 0 & 1 \\ 1/\sqrt{2}j & 0 & 0 \\ 0 & 1 & 0 \end{bmatrix} \quad \frac{1}{\sqrt{3}}\begin{bmatrix} 1/\sqrt{2} & 0 & 0 \\ 0 & 0 & 1 \\ -1/\sqrt{2}j & 0 & 0 \\ 0 & 1 & 0 \end{bmatrix}$$

$$\frac{1}{\sqrt{3}}\begin{bmatrix} 0 & 0 & 1 \\ 1/\sqrt{2} & 0 & 0 \\ 0 & 1 & 0 \\ 1/\sqrt{2} & 0 & 0 \end{bmatrix} \quad \frac{1}{\sqrt{3}}\begin{bmatrix} 0 & 0 & 1 \\ 1/\sqrt{2} & 0 & 0 \\ 0 & 1 & 0 \\ -1/\sqrt{2} & 0 & 0 \end{bmatrix} \quad \frac{1}{\sqrt{3}}\begin{bmatrix} 0 & 0 & 1 \\ 1/\sqrt{2} & 0 & 0 \\ 0 & 1 & 0 \\ 1/\sqrt{2}j & 0 & 0 \end{bmatrix} \quad \frac{1}{\sqrt{3}}\begin{bmatrix} 0 & 0 & 1 \\ 1/\sqrt{2} & 0 & 0 \\ 0 & 1 & 0 \\ -1/\sqrt{2}j & 0 & 0 \end{bmatrix}$$

$$\frac{1}{\sqrt{3}}\begin{bmatrix} 1/\sqrt{2} & 0 & 0 \\ 1/\sqrt{2} & 0 & 0 \\ 0 & 0 & 1 \\ 0 & 1 & 0 \end{bmatrix} \quad \frac{1}{\sqrt{3}}\begin{bmatrix} 1/\sqrt{2} & 0 & 0 \\ -1/\sqrt{2} & 0 & 0 \\ 0 & 0 & 1 \\ 0 & 1 & 0 \end{bmatrix} \quad \frac{1}{\sqrt{3}}\begin{bmatrix} 1/\sqrt{2} & 0 & 0 \\ 0 & 0 & 1 \\ 0 & 1 & 0 \\ 1/\sqrt{2} & 0 & 0 \end{bmatrix} \quad \frac{1}{\sqrt{3}}\begin{bmatrix} 1/\sqrt{2} & 0 & 0 \\ 0 & 0 & 1 \\ 0 & 1 & 0 \\ -1/\sqrt{2} & 0 & 0 \end{bmatrix}$$

$$\frac{1}{\sqrt{3}}\begin{bmatrix} 0 & 0 & 1 \\ 0 & 1 & 0 \\ 1/\sqrt{2} & 0 & 0 \\ 1/\sqrt{2} & 0 & 0 \end{bmatrix} \quad \frac{1}{\sqrt{3}}\begin{bmatrix} 0 & 0 & 1 \\ 0 & 1 & 0 \\ 1/\sqrt{2} & 0 & 0 \\ -1/\sqrt{2} & 0 & 0 \end{bmatrix} \quad \frac{1}{\sqrt{3}}\begin{bmatrix} 0 & 0 & 1 \\ 1/\sqrt{2} & 0 & 0 \\ 1/\sqrt{2} & 0 & 0 \\ 0 & 1 & 0 \end{bmatrix} \quad \frac{1}{\sqrt{3}}\begin{bmatrix} 0 & 0 & 1 \\ 1/\sqrt{2} & 0 & 0 \\ -1/\sqrt{2} & 0 & 0 \\ 0 & 1 & 0 \end{bmatrix}$$

TABLE 21-continued $$\frac{1}{\sqrt{3}}\begin{bmatrix} 1/\sqrt{2} & 0 & 0 \\ 0 & 0 & 1 \\ 0 & -1 & 0 \\ 1/\sqrt{2} & 0 & 0 \end{bmatrix} \quad \frac{1}{\sqrt{3}}\begin{bmatrix} 1/\sqrt{2} & 0 & 0 \\ 0 & 0 & 1 \\ 0 & -1 & 0 \\ -1/\sqrt{2} & 0 & 0 \end{bmatrix} \quad \frac{1}{\sqrt{3}}\begin{bmatrix} 0 & 0 & 1 \\ 1/\sqrt{2} & 0 & 0 \\ 1/\sqrt{2} & 0 & 0 \\ 0 & -1 & 0 \end{bmatrix} \quad \frac{1}{\sqrt{3}}\begin{bmatrix} 0 & 0 & 1 \\ 1/\sqrt{2} & 0 & 0 \\ -1/\sqrt{2} & 0 & 0 \\ 0 & -1 & 0 \end{bmatrix}$$

Table 22 shows 20 precoding matrices that equalize the transmit power ratios between antennas.

TABLE 22

$$\frac{1}{2}\begin{bmatrix} 1 & 0 & 0 \\ 0 & 0 & 1 \\ 1 & 0 & 0 \\ 0 & 1 & 0 \end{bmatrix} \quad \frac{1}{2}\begin{bmatrix} 1 & 0 & 0 \\ 0 & 0 & 1 \\ -1 & 0 & 0 \\ 0 & 1 & 0 \end{bmatrix} \quad \frac{1}{2}\begin{bmatrix} 1 & 0 & 0 \\ 0 & 0 & 1 \\ j & 0 & 0 \\ 0 & 1 & 0 \end{bmatrix} \quad \frac{1}{2}\begin{bmatrix} 1 & 0 & 0 \\ 0 & 0 & 1 \\ -j & 0 & 0 \\ 0 & 1 & 0 \end{bmatrix}$$

$$\frac{1}{2}\begin{bmatrix} 0 & 0 & 1 \\ 1 & 0 & 0 \\ 0 & 1 & 0 \\ 1 & 0 & 0 \end{bmatrix} \quad \frac{1}{2}\begin{bmatrix} 0 & 0 & 1 \\ 1 & 0 & 0 \\ 0 & 1 & 0 \\ -1 & 0 & 0 \end{bmatrix} \quad \frac{1}{2}\begin{bmatrix} 0 & 0 & 1 \\ 1 & 0 & 0 \\ 0 & 1 & 0 \\ j & 0 & 0 \end{bmatrix} \quad \frac{1}{2}\begin{bmatrix} 0 & 0 & 1 \\ 1 & 0 & 0 \\ 0 & 1 & 0 \\ -j & 0 & 0 \end{bmatrix}$$

$$\frac{1}{2}\begin{bmatrix} 1 & 0 & 0 \\ 1 & 0 & 0 \\ 0 & 0 & 1 \\ 0 & 1 & 0 \end{bmatrix} \quad \frac{1}{2}\begin{bmatrix} 1 & 0 & 0 \\ -1 & 0 & 0 \\ 0 & 0 & 1 \\ 0 & 1 & 0 \end{bmatrix} \quad \frac{1}{2}\begin{bmatrix} 1 & 0 & 0 \\ 0 & 0 & 1 \\ 0 & 1 & 0 \\ 1 & 0 & 0 \end{bmatrix} \quad \frac{1}{2}\begin{bmatrix} 1 & 0 & 0 \\ 0 & 0 & 1 \\ 0 & 1 & 0 \\ -1 & 0 & 0 \end{bmatrix}$$

$$\frac{1}{2}\begin{bmatrix} 0 & 0 & 1 \\ 0 & 1 & 0 \\ 1 & 0 & 0 \\ 1 & 0 & 0 \end{bmatrix} \quad \frac{1}{2}\begin{bmatrix} 0 & 0 & 1 \\ 0 & 1 & 0 \\ 1 & 0 & 0 \\ -1 & 0 & 0 \end{bmatrix} \quad \frac{1}{2}\begin{bmatrix} 0 & 0 & 1 \\ 1 & 0 & 0 \\ 1 & 0 & 0 \\ 0 & 1 & 0 \end{bmatrix} \quad \frac{1}{2}\begin{bmatrix} 0 & 0 & 1 \\ 1 & 0 & 0 \\ -1 & 0 & 0 \\ 0 & 1 & 0 \end{bmatrix}$$

$$\frac{1}{2}\begin{bmatrix} 1 & 0 & 0 \\ 0 & 0 & 1 \\ 0 & -1 & 0 \\ 1 & 0 & 0 \end{bmatrix} \quad \frac{1}{2}\begin{bmatrix} 1 & 0 & 0 \\ 0 & 0 & 1 \\ 0 & -1 & 0 \\ -1 & 0 & 0 \end{bmatrix} \quad \frac{1}{2}\begin{bmatrix} 0 & 0 & 1 \\ 1 & 0 & 0 \\ 1 & 0 & 0 \\ 0 & -1 & 0 \end{bmatrix} \quad \frac{1}{2}\begin{bmatrix} 0 & 0 & 1 \\ 1 & 0 & 0 \\ -1 & 0 & 0 \\ 0 & -1 & 0 \end{bmatrix}$$

Table 23 shows 12 precoding matrices that equalize the transmit power ratios between antennas.

TABLE 23

$$\frac{1}{2}\begin{bmatrix} 1 & 0 & 0 \\ 0 & 0 & 1 \\ 1 & 0 & 0 \\ 0 & 1 & 0 \end{bmatrix} \quad \frac{1}{2}\begin{bmatrix} 0 & 0 & 1 \\ 1 & 0 & 0 \\ 0 & 1 & 0 \\ 1 & 0 & 0 \end{bmatrix} \quad \frac{1}{2}\begin{bmatrix} 1 & 0 & 0 \\ 1 & 0 & 0 \\ 0 & 0 & 1 \\ 0 & 1 & 0 \end{bmatrix}$$

$$\frac{1}{2}\begin{bmatrix} 1 & 0 & 0 \\ 0 & 0 & 1 \\ -1 & 0 & 0 \\ 0 & 1 & 0 \end{bmatrix} \quad \frac{1}{2}\begin{bmatrix} 0 & 0 & 1 \\ 1 & 0 & 0 \\ 0 & 1 & 0 \\ -1 & 0 & 0 \end{bmatrix} \quad \frac{1}{2}\begin{bmatrix} 1 & 0 & 0 \\ -1 & 0 & 0 \\ 0 & 0 & 1 \\ 0 & 1 & 0 \end{bmatrix}$$

TABLE 23-continued $$\frac{1}{2}\begin{bmatrix} 1 & 0 & 0 \\ 0 & 0 & 1 \\ j & 0 & 0 \\ 0 & 1 & 0 \end{bmatrix} \quad \frac{1}{2}\begin{bmatrix} 0 & 0 & 1 \\ 1 & 0 & 0 \\ 0 & 1 & 0 \\ j & 0 & 0 \end{bmatrix} \quad \frac{1}{2}\begin{bmatrix} 0 & 0 & 1 \\ 0 & 1 & 0 \\ 1 & 0 & 0 \\ 1 & 0 & 0 \end{bmatrix}$$

$$\frac{1}{2}\begin{bmatrix} 1 & 0 & 0 \\ 0 & 0 & 1 \\ -j & 0 & 0 \\ 0 & 1 & 0 \end{bmatrix} \quad \frac{1}{2}\begin{bmatrix} 0 & 0 & 1 \\ 1 & 0 & 0 \\ 0 & 1 & 0 \\ -j & 0 & 0 \end{bmatrix} \quad \frac{1}{2}\begin{bmatrix} 0 & 0 & 1 \\ 0 & 1 & 0 \\ 1 & 0 & 0 \\ -1 & 0 & 0 \end{bmatrix}$$

Table 24 shows another of the preceding matrices according to the fourth embodiment of the present invention.

TABLE 24

$$\frac{1}{\sqrt{3}}\begin{bmatrix} 1/\sqrt{2} & 0 & 0 \\ 0 & 1 & 0 \\ 1/\sqrt{2} & 0 & 0 \\ 0 & 0 & 1 \end{bmatrix} \quad \frac{1}{\sqrt{3}}\begin{bmatrix} 1/\sqrt{2} & 0 & 0 \\ 0 & 1 & 0 \\ -1/\sqrt{2} & 0 & 0 \\ 0 & 0 & 1 \end{bmatrix} \quad \frac{1}{\sqrt{3}}\begin{bmatrix} 1/\sqrt{2} & 0 & 0 \\ 0 & 1 & 0 \\ j/\sqrt{2} & 0 & 0 \\ 0 & 0 & 1 \end{bmatrix} \quad \frac{1}{\sqrt{3}}\begin{bmatrix} 1/\sqrt{2} & 0 & 0 \\ 0 & 1 & 0 \\ -j/\sqrt{2} & 0 & 0 \\ 0 & 0 & 1 \end{bmatrix}$$

$$\frac{1}{\sqrt{3}}\begin{bmatrix} 0 & 1 & 0 \\ 1/\sqrt{2} & 0 & 0 \\ 0 & 0 & 1 \\ 1/\sqrt{2} & 0 & 0 \end{bmatrix} \quad \frac{1}{\sqrt{3}}\begin{bmatrix} 0 & 1 & 0 \\ 1/\sqrt{2} & 0 & 0 \\ 0 & 0 & 1 \\ -1/\sqrt{2} & 0 & 0 \end{bmatrix} \quad \frac{1}{\sqrt{3}}\begin{bmatrix} 0 & 1 & 0 \\ 1/\sqrt{2} & 0 & 0 \\ 0 & 0 & 1 \\ j/\sqrt{2} & 0 & 0 \end{bmatrix} \quad \frac{1}{\sqrt{3}}\begin{bmatrix} 0 & 1 & 0 \\ 1/\sqrt{2} & 0 & 0 \\ 0 & 0 & 1 \\ -j/\sqrt{2} & 0 & 0 \end{bmatrix}$$

$$\frac{1}{\sqrt{3}}\begin{bmatrix} 1/\sqrt{2} & 0 & 0 \\ 1/\sqrt{2} & 0 & 0 \\ 0 & 1 & 0 \\ 0 & 0 & 1 \end{bmatrix} \quad \frac{1}{\sqrt{3}}\begin{bmatrix} 1/\sqrt{2} & 0 & 0 \\ -1/\sqrt{2} & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ 1/\sqrt{2} & 0 & 0 \end{bmatrix} \quad \frac{1}{\sqrt{3}}\begin{bmatrix} 0 & 1 & 0 \\ 0 & 0 & 1 \\ 1/\sqrt{2} & 0 & 0 \\ -1/\sqrt{2} & 0 & 0 \end{bmatrix}$$

$$\frac{1}{2}\begin{bmatrix} 1 & 0 & 0 \\ 1 & 0 & 0 \\ 0 & 1 & 0 \\ 0 & 0 & 1 \end{bmatrix} \quad \frac{1}{2}\begin{bmatrix} 1 & 0 & 0 \\ -1 & 0 & 0 \\ 0 & 1 & 0 \\ 0 & 0 & 1 \end{bmatrix} \quad \frac{1}{2}\begin{bmatrix} 0 & 1 & 0 \\ 0 & 0 & 1 \\ 1 & 0 & 0 \\ 1 & 0 & 0 \end{bmatrix} \quad \frac{1}{2}\begin{bmatrix} 0 & 1 & 0 \\ 0 & 0 & 1 \\ 1 & 0 & 0 \\ -1 & 0 & 0 \end{bmatrix}$$

$$\frac{1}{2}\begin{bmatrix} 1 & 0 & 0 \\ 0 & 1 & 0 \\ 1 & 0 & 0 \\ 0 & 0 & 1 \end{bmatrix} \quad \frac{1}{2}\begin{bmatrix} 1 & 0 & 0 \\ 0 & 1 & 0 \\ -1 & 0 & 0 \\ 0 & 0 & 1 \end{bmatrix} \quad \frac{1}{2}\begin{bmatrix} 0 & 1 & 0 \\ 1 & 0 & 0 \\ 0 & 0 & 1 \\ 1 & 0 & 0 \end{bmatrix} \quad \frac{1}{2}\begin{bmatrix} 0 & 1 & 0 \\ 1 & 0 & 0 \\ 0 & 0 & 1 \\ -1 & 0 & 0 \end{bmatrix}$$

As shown in Table 24, another codebook according to the fourth embodiment of the present invention includes 20 precoding matrices.

In the case where the transmit power is unlimited, one of the following two methods can be used.

The first method is to use all of the 20 precoding matrices including 12 precoding matrices that equalize the power ratios between layers and 8 precoding matrices that equalize the power ratios between antennas, and the second method is to use only the 12 precoding matrices that equalize the power ratios between layers.

The 12 precoding matrices, extracted from Table 24, that equalize the power ratios between layers are shown in Table 25.

In case that the transmit power is limited, the 8 precoding matrices, extracted from Table 24 that equalize the power ratios between antennas are used. The 8 precoding matrices that equalize the power ratios between antennas shown in Table 26.

TABLE 26

$$\frac{1}{2}\begin{bmatrix} 1 & 0 & 0 \\ 1 & 0 & 0 \\ 0 & 1 & 0 \\ 0 & 0 & 1 \end{bmatrix} \quad \frac{1}{2}\begin{bmatrix} 1 & 0 & 0 \\ -1 & 0 & 0 \\ 0 & 1 & 0 \\ 0 & 0 & 1 \end{bmatrix} \quad \frac{1}{2}\begin{bmatrix} 0 & 1 & 0 \\ 0 & 0 & 1 \\ 1 & 0 & 0 \\ 1 & 0 & 0 \end{bmatrix} \quad \frac{1}{2}\begin{bmatrix} 0 & 1 & 0 \\ 0 & 0 & 1 \\ 1 & 0 & 0 \\ -1 & 0 & 0 \end{bmatrix}$$

TABLE 25

$$\frac{1}{\sqrt{3}}\begin{bmatrix} 1/\sqrt{2} & 0 & 0 \\ 0 & 1 & 0 \\ 1/\sqrt{2} & 0 & 0 \\ 0 & 0 & 1 \end{bmatrix} \quad \frac{1}{\sqrt{3}}\begin{bmatrix} 1/\sqrt{2} & 0 & 0 \\ 0 & 1 & 0 \\ -1/\sqrt{2} & 0 & 0 \\ 0 & 0 & 1 \end{bmatrix} \quad \frac{1}{\sqrt{3}}\begin{bmatrix} 1/\sqrt{2} & 0 & 0 \\ 0 & 1 & 0 \\ j/\sqrt{2} & 0 & 0 \\ 0 & 0 & 1 \end{bmatrix} \quad \frac{1}{\sqrt{3}}\begin{bmatrix} 1/\sqrt{2} & 0 & 0 \\ 0 & 1 & 0 \\ -j/\sqrt{2} & 0 & 0 \\ 0 & 0 & 1 \end{bmatrix}$$

$$\frac{1}{\sqrt{3}}\begin{bmatrix} 0 & 1 & 0 \\ 1/\sqrt{2} & 0 & 0 \\ 0 & 0 & 1 \\ 1/\sqrt{2} & 0 & 0 \end{bmatrix} \quad \frac{1}{\sqrt{3}}\begin{bmatrix} 0 & 1 & 0 \\ 1/\sqrt{2} & 0 & 0 \\ 0 & 0 & 1 \\ -1/\sqrt{2} & 0 & 0 \end{bmatrix} \quad \frac{1}{\sqrt{3}}\begin{bmatrix} 0 & 1 & 0 \\ 1/\sqrt{2} & 0 & 0 \\ 0 & 0 & 1 \\ j/\sqrt{2} & 0 & 0 \end{bmatrix} \quad \frac{1}{\sqrt{3}}\begin{bmatrix} 0 & 1 & 0 \\ 1/\sqrt{2} & 0 & 0 \\ 0 & 0 & 1 \\ -j/\sqrt{2} & 0 & 0 \end{bmatrix}$$

$$\frac{1}{\sqrt{3}}\begin{bmatrix} 1/\sqrt{2} & 0 & 0 \\ 1/\sqrt{2} & 0 & 0 \\ 0 & 1 & 0 \\ 0 & 0 & 1 \end{bmatrix} \quad \frac{1}{\sqrt{3}}\begin{bmatrix} 1/\sqrt{2} & 0 & 0 \\ -1/\sqrt{2} & 0 & 0 \\ 0 & 1 & 0 \\ 0 & 0 & 1 \end{bmatrix} \quad \frac{1}{\sqrt{3}}\begin{bmatrix} 0 & 1 & 0 \\ 0 & 0 & 1 \\ 1/\sqrt{2} & 0 & 0 \\ 1/\sqrt{2} & 0 & 0 \end{bmatrix} \quad \frac{1}{\sqrt{3}}\begin{bmatrix} 0 & 1 & 0 \\ 0 & 0 & 1 \\ 1/\sqrt{2} & 0 & 0 \\ -1/\sqrt{2} & 0 & 0 \end{bmatrix}$$

TABLE 26-continued $$\frac{1}{2}\begin{bmatrix}1&0&0\\0&1&0\\1&0&0\\0&0&1\end{bmatrix} \quad \frac{1}{2}\begin{bmatrix}1&0&0\\0&1&0\\-1&0&0\\0&0&1\end{bmatrix} \quad \frac{1}{2}\begin{bmatrix}0&1&0\\1&0&0\\0&0&1\\1&0&0\end{bmatrix} \quad \frac{1}{2}\begin{bmatrix}0&1&0\\1&0&0\\0&0&1\\-1&0&0\end{bmatrix}$$

In another example of the precoding matrices, 12 precoding matrices that equalize the transmit power ratios between antennas, as shown in Table 27, are used. The precoding matrices shown in Table 27 are employed for the antenna configuration of a transmitter to be described with reference to FIG. 12.

TABLE 27

$$\frac{1}{2}\begin{bmatrix}1&0&0\\1&0&0\\0&1&0\\0&0&1\end{bmatrix} \quad \frac{1}{2}\begin{bmatrix}1&0&0\\-1&0&0\\0&1&0\\0&0&1\end{bmatrix} \quad \frac{1}{2}\begin{bmatrix}1&0&0\\j&0&0\\0&1&0\\0&0&1\end{bmatrix} \quad \frac{1}{2}\begin{bmatrix}1&0&0\\-j&0&0\\0&1&0\\0&0&1\end{bmatrix}$$

$$\frac{1}{2}\begin{bmatrix}0&1&0\\0&0&1\\1&0&0\\1&0&0\end{bmatrix} \quad \frac{1}{2}\begin{bmatrix}0&1&0\\0&0&1\\1&0&0\\-1&0&0\end{bmatrix} \quad \frac{1}{2}\begin{bmatrix}0&1&0\\0&0&1\\1&0&0\\j&0&0\end{bmatrix} \quad \frac{1}{2}\begin{bmatrix}0&1&0\\0&0&1\\1&0&0\\-j&0&0\end{bmatrix}$$

$$\frac{1}{2}\begin{bmatrix}1&0&0\\0&1&0\\1&0&0\\0&0&1\end{bmatrix} \quad \frac{1}{2}\begin{bmatrix}1&0&0\\0&1&0\\-1&0&0\\0&0&1\end{bmatrix} \quad \frac{1}{2}\begin{bmatrix}0&1&0\\1&0&0\\0&0&1\\1&0&0\end{bmatrix} \quad \frac{1}{2}\begin{bmatrix}0&1&0\\1&0&0\\0&0&1\\-1&0&0\end{bmatrix}$$

In another of the precoding matrices, 12 precoding matrices that equalize the transmit power ratios between antennas, as shown in Table 28, are used. The precoding matrices shown in Table 28 are employed for the antenna configuration of a transmitter to be described with reference to FIG. 12.

TABLE 28

$$\frac{1}{2}\begin{bmatrix}1&0&0\\1&0&0\\0&1&0\\0&0&1\end{bmatrix} \quad \frac{1}{2}\begin{bmatrix}1&0&0\\-1&0&0\\0&1&0\\0&0&1\end{bmatrix} \quad \frac{1}{2}\begin{bmatrix}1&0&0\\j&0&0\\0&1&0\\0&0&1\end{bmatrix} \quad \frac{1}{2}\begin{bmatrix}1&0&0\\-j&0&0\\0&1&0\\0&0&1\end{bmatrix}$$

$$\frac{1}{2}\begin{bmatrix}0&1&0\\0&0&1\\1&0&0\\1&0&0\end{bmatrix} \quad \frac{1}{2}\begin{bmatrix}0&1&0\\0&0&1\\1&0&0\\-1&0&0\end{bmatrix} \quad \frac{1}{2}\begin{bmatrix}0&1&0\\0&0&1\\1&0&0\\j&0&0\end{bmatrix} \quad \frac{1}{2}\begin{bmatrix}0&1&0\\0&0&1\\1&0&0\\-j&0&0\end{bmatrix}$$

$$\frac{1}{2}\begin{bmatrix}1&0&0\\0&1&0\\0&0&1\\1&0&0\end{bmatrix} \quad \frac{1}{2}\begin{bmatrix}1&0&0\\0&1&0\\0&0&1\\-1&0&0\end{bmatrix} \quad \frac{1}{2}\begin{bmatrix}0&1&0\\1&0&0\\1&0&0\\0&0&1\end{bmatrix} \quad \frac{1}{2}\begin{bmatrix}0&1&0\\1&0&0\\-1&0&0\\0&0&1\end{bmatrix}$$

In another of the precoding matrices, 12 precoding matrices that equalize the transmit power ratios between antennas, as shown in Table 29, are used. The precoding matrices shown in Table 29 are employed for the antenna configuration of a transmitter to be described with reference to FIG. 12. In Table 29, the power ratio among the layers is 2:1:1.

TABLE 29

$$\frac{1}{2}\begin{bmatrix}1&0&0\\1&0&0\\0&1&0\\0&0&1\end{bmatrix} \quad \frac{1}{2}\begin{bmatrix}1&0&0\\-1&0&0\\0&1&0\\0&0&1\end{bmatrix} \quad \frac{1}{2}\begin{bmatrix}1&0&0\\0&1&0\\0&0&1\\1&0&0\end{bmatrix} \quad \frac{1}{2}\begin{bmatrix}1&0&0\\0&1&0\\0&0&1\\-1&0&0\end{bmatrix}$$

$$\frac{1}{2}\begin{bmatrix}0&1&0\\0&0&1\\1&0&0\\1&0&0\end{bmatrix} \quad \frac{1}{2}\begin{bmatrix}0&1&0\\0&0&1\\1&0&0\\-1&0&0\end{bmatrix} \quad \frac{1}{2}\begin{bmatrix}0&1&0\\1&0&0\\1&0&0\\0&0&1\end{bmatrix} \quad \frac{1}{2}\begin{bmatrix}0&1&0\\1&0&0\\-1&0&0\\0&0&1\end{bmatrix}$$

$$\frac{1}{2}\begin{bmatrix}1&0&0\\0&1&0\\1&0&0\\0&0&1\end{bmatrix} \quad \frac{1}{2}\begin{bmatrix}1&0&0\\0&1&0\\-1&0&0\\0&0&1\end{bmatrix} \quad \frac{1}{2}\begin{bmatrix}0&1&0\\1&0&0\\0&0&1\\1&0&0\end{bmatrix} \quad \frac{1}{2}\begin{bmatrix}0&1&0\\1&0&0\\0&0&1\\-1&0&0\end{bmatrix}$$

In another of the precoding matrices, 8 precoding matrices that equalize the transmit power ratios between antennas, as shown in Table 30, are used. The precoding matrices shown in Table 30 are employed for the antenna configuration of a transmitter to be described with reference to FIG. 12.

TABLE 30

$$\frac{1}{2}\begin{bmatrix}1&0&0\\1&0&0\\0&1&0\\0&0&1\end{bmatrix} \quad \frac{1}{2}\begin{bmatrix}1&0&0\\-1&0&0\\0&1&0\\0&0&1\end{bmatrix} \quad \frac{1}{2}\begin{bmatrix}1&0&0\\0&1&0\\0&0&1\\1&0&0\end{bmatrix} \quad \frac{1}{2}\begin{bmatrix}1&0&0\\0&1&0\\0&0&1\\-1&0&0\end{bmatrix}$$

$$\frac{1}{2}\begin{bmatrix}0&1&0\\0&0&1\\1&0&0\\1&0&0\end{bmatrix} \quad \frac{1}{2}\begin{bmatrix}0&1&0\\0&0&1\\1&0&0\\-1&0&0\end{bmatrix} \quad \frac{1}{2}\begin{bmatrix}0&1&0\\1&0&0\\1&0&0\\0&0&1\end{bmatrix} \quad \frac{1}{2}\begin{bmatrix}0&1&0\\1&0&0\\-1&0&0\\0&0&1\end{bmatrix}$$

In another of the precoding matrices, 8 precoding matrices that equalize the transmit power ratios between antennas, as shown in Table 31, are used. The precoding matrices shown in Table 31 are employed for the antenna configuration of a transmitter to be described with reference to FIG. 12.

TABLE 31

$$\frac{1}{2}\begin{bmatrix}1&0&0\\1&0&0\\0&0&1\\0&1&0\end{bmatrix} \quad \frac{1}{2}\begin{bmatrix}1&0&0\\-1&0&0\\0&0&1\\0&1&0\end{bmatrix} \quad \frac{1}{2}\begin{bmatrix}1&0&0\\0&0&1\\1&0&0\\0&1&0\end{bmatrix} \quad \frac{1}{2}\begin{bmatrix}1&0&0\\0&0&1\\-1&0&0\\0&1&0\end{bmatrix}$$

$$\frac{1}{2}\begin{bmatrix}0&0&1\\0&1&0\\1&0&0\\1&0&0\end{bmatrix} \quad \frac{1}{2}\begin{bmatrix}0&0&1\\0&1&0\\1&0&0\\-1&0&0\end{bmatrix} \quad \frac{1}{2}\begin{bmatrix}0&0&1\\1&0&0\\0&1&0\\1&0&0\end{bmatrix} \quad \frac{1}{2}\begin{bmatrix}0&0&1\\1&0&0\\0&1&0\\-1&0&0\end{bmatrix}$$

Figure 7:
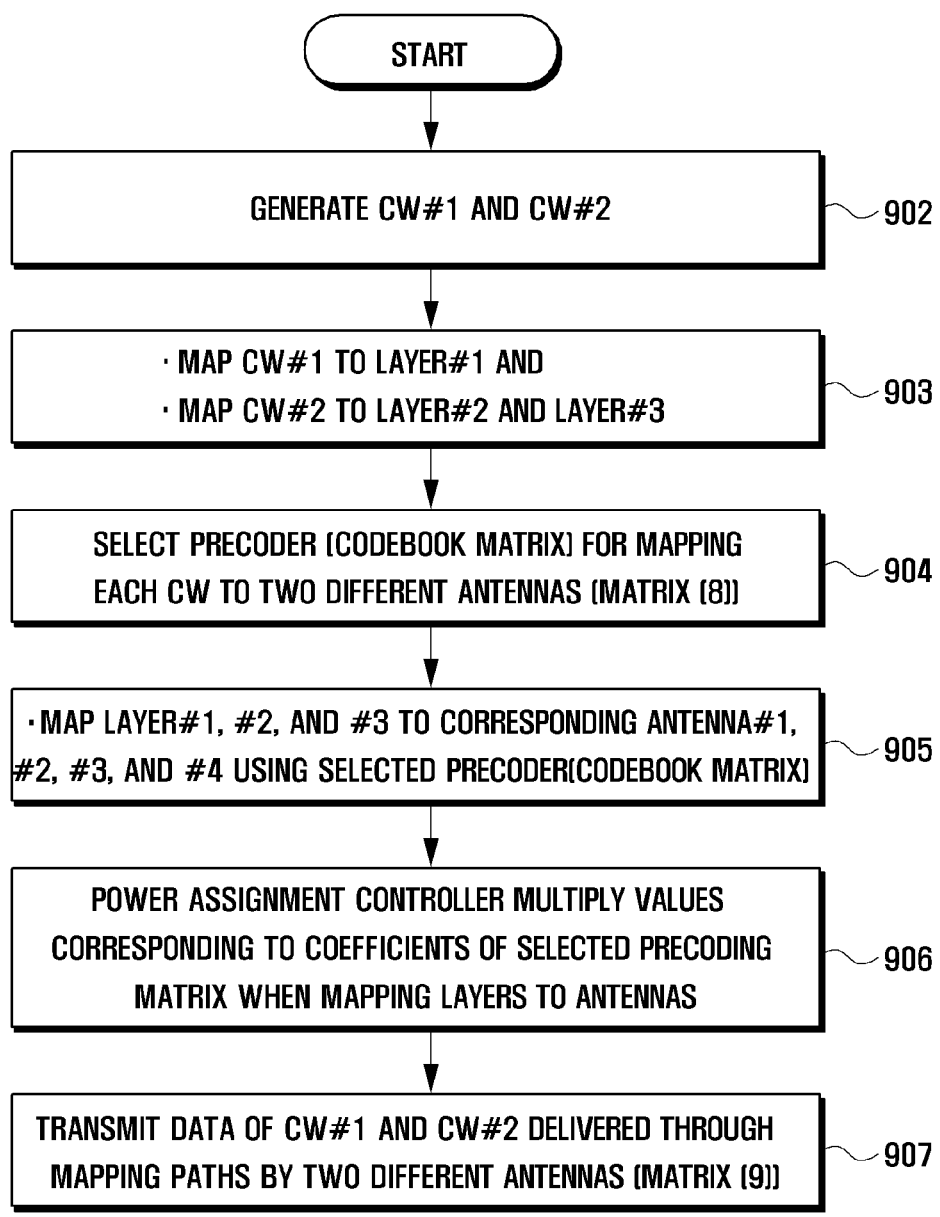
FIG. 7 is a flowchart illustrating a codebook mapping procedure of the transmission method according to a fourth embodiment of the present invention.

FIG. 7 is a flowchart illustrating a codebook mapping procedure of the transmission method according to the fourth embodiment of the present invention.

In FIG. 7, two codewords (CW#1 and CW#2) are mapped to three layers (Layer#1, Layer#2, and Layer#3), and the three layers are mapped to four antennas (Antenna#1, Antenna#2, Antenna#3, and Antenna#4) for transmitting the two codewords through the four antennas.

Referring to FIG. 7, in step 902, the transmitter first generates the two codewords (CW#1 and CW#2).

Next, in step 903, the transmitter maps the codeword 1 (CW#1) to the layer 1 (Layer#1) and maps the codeword 2 (CW#2) to the layer 2 (Layer#2) and the layer 3 (Layer#3).

In step 904, the transmitter selects a precoding matrix, from one of the codebooks of Table 10 and Table 11, which can transmit the most data in rank-3 channel environment, based on the channel information. That is, the transmitter chooses one of the precoding matrices from the codebook provided for mapping the codeword 1 (CW#1) and the codeword 2 (CW#2) to different antennas.

Here, it is assumed that the transmitter selects the following precoding is matrix (8) from the codebook of Table 11 by means of a scheduler.

$$\frac{1}{\sqrt{3}}\begin{bmatrix} 1/\sqrt{2} & 0 & 0 \\ 1/\sqrt{2}\,j & 0 & 0 \\ 0 & 1 & 0 \\ 0 & 0 & 1 \end{bmatrix} \quad (8)$$

In step 905, the transmitter maps the layer 1 (Layer#1) to the antenna 1 (Antenna#1) and the antenna 2 (Antenna#2), the layer 2 (Layer#2) to the antenna 3 (Antenna#3), and the layer 3 (Layer#3) to the antenna 4 (Antenna#4) using the selected precoding matrix (8).

In step 906, the power assignment controller 213 of the transmitter multiplies the factor values of non-zero elements of the precoding matrix between the corresponding layers and antennas and equalizes the power of the layers.

That is, in the case where the precoding matrix (8) is used, the precoder of the transmitter multiplies P1 between the layer 1 (Layer#1) and the antenna 1 (Antenna#1), P2 between the layer 1 (Layer#1) and the antenna 2 (Antenna#2), P3 between the layer 2 (Layer#2) and the antenna 3 (Antenna#3), and P4 between the layer 3 (Layer#3) and the antenna 4 (Antenna#4).

In this embodiment, if the codebook is expressed in the normalized form, P1 is $1/\sqrt{6}$, and P2 is $1/\sqrt{6}j$. Also, in this embodiment P3 and P4 are 1. If the codebook is expressed in the normalized form, P3 and P4 become $1/\sqrt{3}$.

Next, in step 907, the transmitter transmits each codeword through two different antennas.

Since the codeword 1 (CW#1) is mapped to the layer 1 (Layer#1), the codeword 1 (CW#1) is transmitted through the antenna 1 (Antenna#1) and the antenna 2 (Antenna#2). Also, since the codeword 2 (CW#2) is mapped to the layer 3 (Layer#3), the codeword 2 (CW#2) is transmitted through the antenna 3 (Antenna#3) and the antenna 4 (Antenna#4).

In this manner, the codeword 1 (CW#1) and the codeword 2 (CW#2) are transmitted through two different pairs of antennas with the same power to the layers 1 to 3 (Layer#1, Layer#2, and Layer#3).

Figure 8:
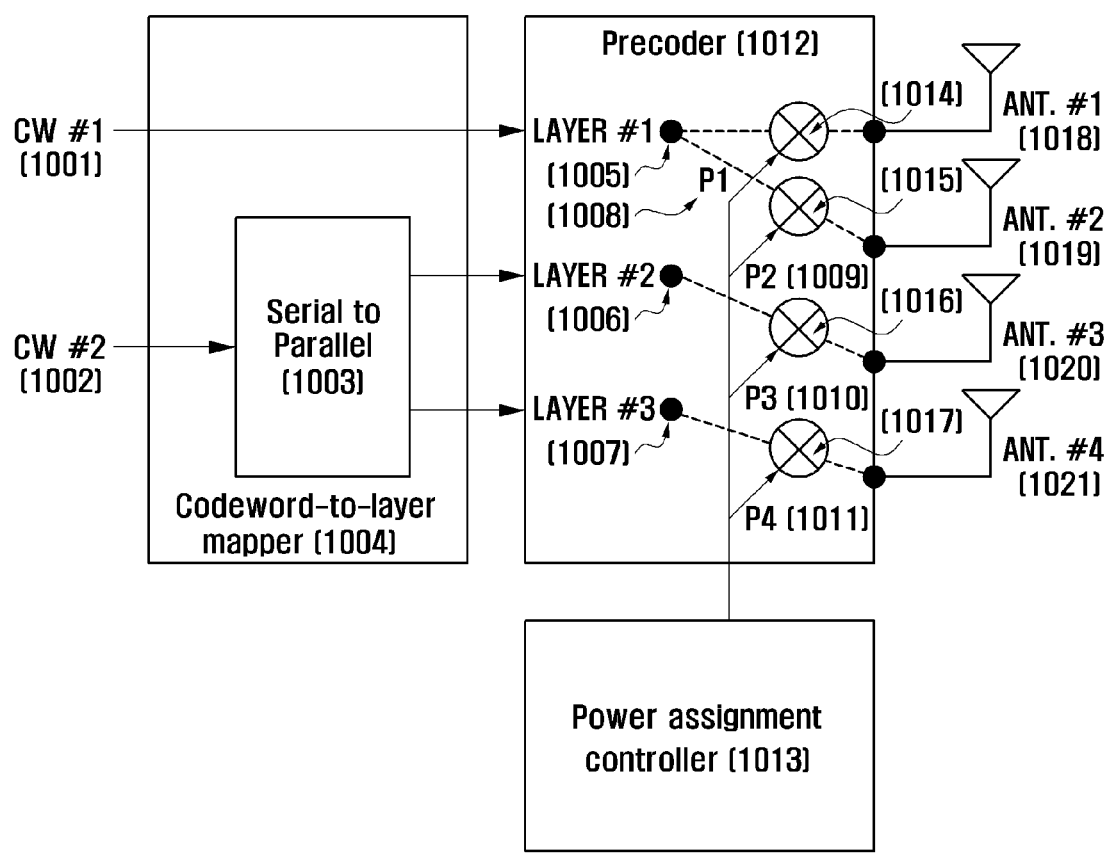
FIG. 8 is a block diagram illustrating a confirmation of the transmitter for use in the transmission method according to the fourth embodiment of the present invention.

FIG. 8 is a block diagram illustrating a confirmation of the transmitter for use in the transmission method according to the fourth embodiment of the present invention.

As shown in FIG. 8, the transmitter according to the fourth embodiment of the present invention includes a mapper (codeword-to-layer mapper) 1004, a precoder 1012, a power assignment controller 1013, and a plurality of antennas 1018, 1019, 1020, and 1021.

The mapper 1004 is responsible for mapping multiple codewords to multiple layers. The mapper 1004 is provided with a serial-to-parallel converter 1003 for mapping a codeword to at least two layers. In FIG. 8, the serial-to-parallel converter 1003 divides an input codeword into two parts that are mapped to two separate layers.

The mapper 1004 maps the codeword 1 (CW#1) 1001 to the layer 1 (Layer#1) 1005 and maps the codeword 2 (CW#2) 1002 to the layer 2 (Layer#2) 1006 and the layer 3 (Layer#3) 1007.

The precoder 1012 is responsible for mapping the layers to the antennas. That is, the precoder 1012 maps the layer 1 (Layer#1) 1005 to the antenna 1 (Antenna#1) 1018 and the antenna 2 (Antenna#2) 1019, the layer 2 (Layer#2) 1005 to the antenna 3 (Antenna#3) 1020, and the layer 3 (Layer#3) 1007 to the antenna 4 (Antenna#4) 1021.

The power assignment controller 1013 multiplies the values (P1, P2, P3, and P4) 1008, 1009, 1010, and 1011 of the non-zero elements of the precoding matrix selected from the codebook of Table 11 between the corresponding layers 1005, 1006, and 1007 and antennas 1018, 1019, 1020, and 1021 by means of multipliers 1014, 1015, 1016, and 1017 and equalizes the powers assigned to the layers 1005, 1006, and 1007.

That is, P1 1008 is multiplied between the layer 1 (Layer#1) 1005 and the antenna 1 (Antenna#1) 1018 by means of the multiplier 1014, and P2 1009 is multiplied between the layer 1 (Layer#1) 1005 and the antenna 2 (Antenna#2) 1019 by means of the multiplier 1016, in the precoder 1012.

If the precoding matrix (8) is selected and if the codebook is expressed in the normalized form, P1 1008 and P2 1009 are $1/\sqrt{6}$ and $1/\sqrt{6}j$, respectively. The codeword 2 (CW#2) 1002 is parallelized by the serial-to-parallel converter 1003 so as to be mapped to the layer 2 (Layer#2) 1006 and the layer 3 (Layer#3) 1007. The codeword 2 is mapped to antenna 3 (Antenna#3) 1020 via the layer 2 (Layer#2) 1006 and to the antenna 4 (Antenna#4) 1021 via the layer 3 (Layer#3) 1007, by the precoder 1012.

In the precoder 1012, P3 1010 is multiplied between the layer 2 (Layer#2) 1006 and the antenna 3 (Antenna#3) 1020 by means of the multiplier 1016, and P4 1011 is multiplied between the layer 3 (Layer#3) 1007 and the antenna 4 (Antenna#4) 1021 by means of the multiplier 1017.

If the codebook is expressed in the normalized form, P3 1010 and P4 1011 are $1/\sqrt{3}$.

Fifth Embodiment

A fifth embodiment is directed to the case in which a precoding matrix that makes the power ratios between antennas is selected from the codebook (Table 8, 10, or 11) of the fourth embodiment.

Figure 9:
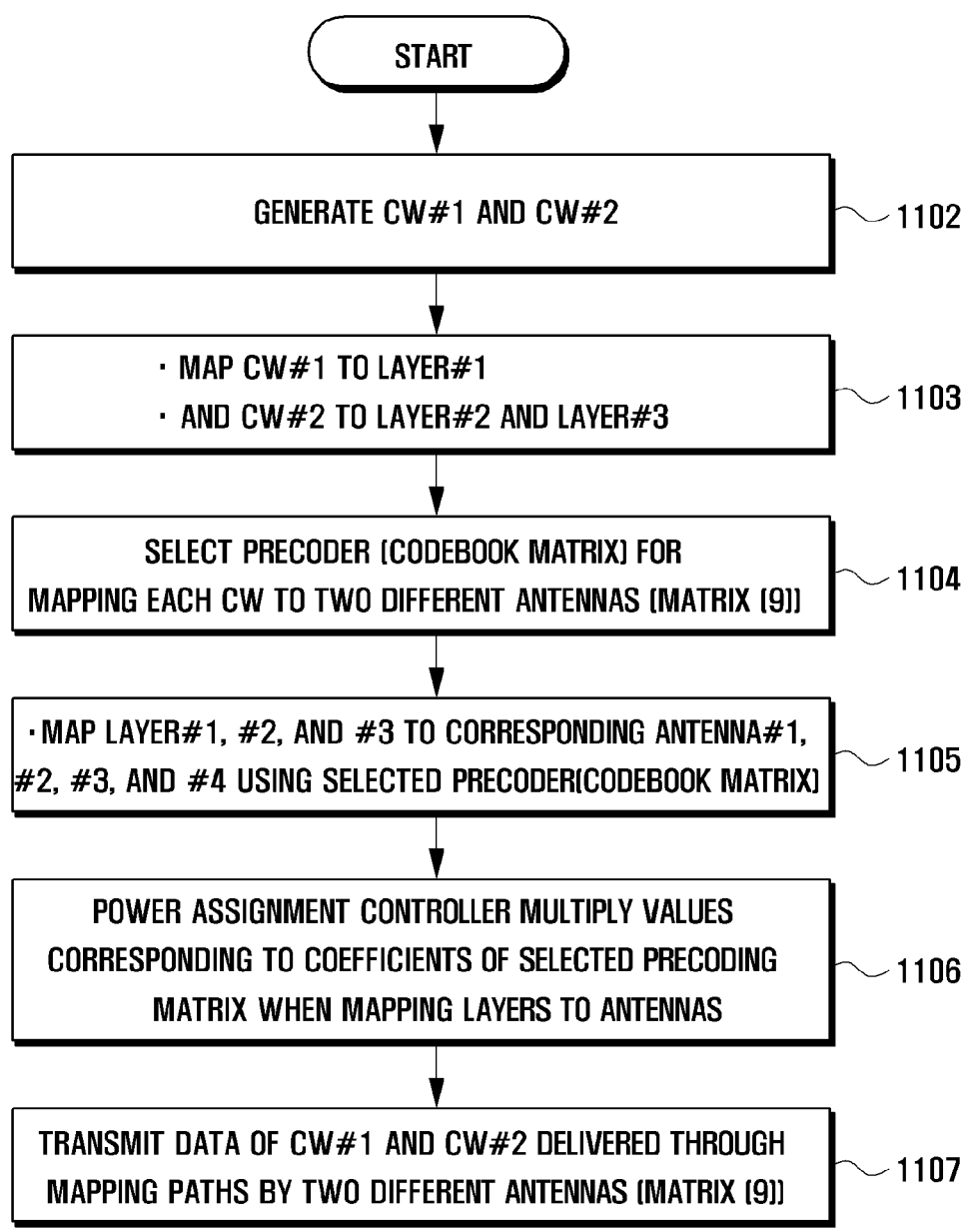
FIG. 9 is a flowchart illustrating a codebook mapping procedure of the transmission method according to a fifth embodiment of the present invention.

FIG. 9 is a flowchart illustrating a codebook mapping procedure of the transmission method according to the fifth embodiment of the present invention.

Referring to FIG. 9, in step 1102, the transmitter first generates two different codewords (CW#1 and CW#2).

Next, in step 1103, the transmitter maps the codeword 1 (CW#1) to the layer 1 (Layer#1) and maps the codeword 2 (CW#2) to the layer 2 (Layer#2) and layer 3 (Layer#3).

In step 1104, the transmitter selects one of the precoding matrices that are formed to map the codeword 1 (CW#1) and the codeword 2 (CW#2) to different antennas in the codebook of table 11, based on the channel information.

Here, it is assumed that the scheduler of the transmitter selects the following precoding matrix (9) that makes the power ratios between the antennas equal in the codebook of Table 11.

$$\frac{1}{2}\begin{bmatrix} 1 & 0 & 0 \\ 0 & 1 & 0 \\ 1 & 0 & 0 \\ 0 & 0 & 1 \end{bmatrix} \quad (9)$$

In step 1105, the transmitter maps the layer 1 (Layer#1) to the antenna 1 (Antenna#1) and the antenna 3 (Antenna#3), the layer 2 (Layer#2) to the antenna 2 (Antenna#2), and the layer 3 (layer#3) to the antenna 4 (Antenna#4) using the selected precoding matrix (9).

In step 1106, the power assignment controller 1213 of the transmitter multiplies the values of the non-zero elements of the precoding matrix (coefficient of the precoding matrix) between corresponding layers and antennas so as to equalize the powers of the antennas.

In the case where using the precoding matrix (9), the precoder of the transmitter multiplies P1 value between the layer 1 (Layer#1) and the antenna 1 (Antenna#1), P2 value between the layer 1 (Layer#1) and the antenna 3 (Antenna#3), P3 value between the layer 2 (Layer#2) and the antenna 2 (Antenna#2), and P4 value between the layer 3 (Layer#3) and the antenna 4 (Antenna#4).

In this embodiment of the present invention, if the codebook is expressed in the normalized form, P1 and P2 are 1/2.

Next, in step 1107, the transmitter transmits each codeword mapped in the above manner through two different antennas.

Since it is mapped to the layer 1 (Layer#1), the codeword 1 (CW#1) is transmitted through the antenna 1 (Antenna#1) and the antenna 3 (Antenna#3). Also, the codeword 2 (CW#2) which is mapped to the layer 2 (Layer#2) and the layer 3 (Layer#3) are transmitted through the antenna 2 (Antenna#2) and the antenna 4 (Antenna#4).

In this manner, each of the codeword 1 (CW#1) and the codeword 2 (CW#2) is transmitted through two different antennas. At this time, the power ratios between antennas 1 to 4 (Antenna#1, Antenna#2, Antenna#3, and Antenna#4) are equal to each other.

Figure 10:
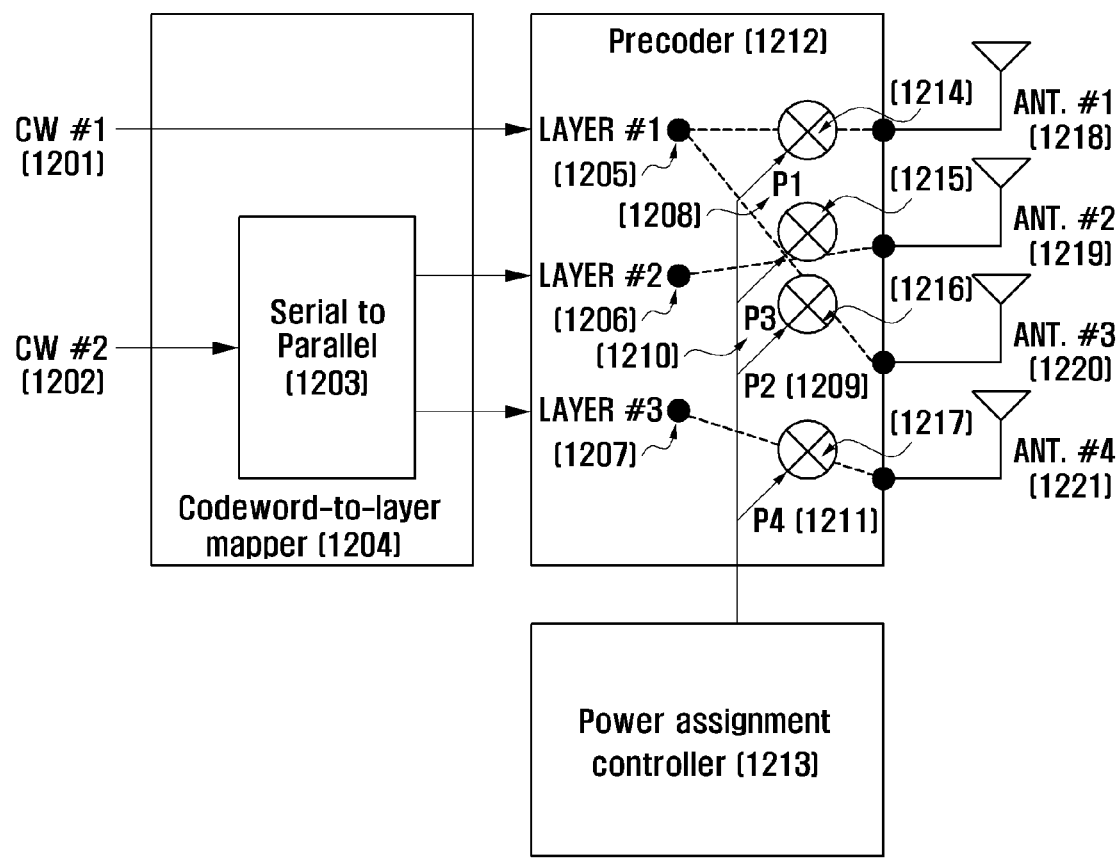
FIG. 10 is a block diagram illustrating a configuration of the transmitter for use in the transmission method according to the fifth embodiment of the present invention.

FIG. 10 is a block diagram illustrating a configuration of the transmitter for use in the transmission method according to the fifth embodiment of the present invention. Although the transmitter of FIG. 10 is identical with the transmitter of FIG. 8 in functionality, they are separately depicted for describing different embodiments.

Referring to FIG. 10, the transmitter according to the fifth embodiment of the present invention includes a mapper (codeword-to-layer mapper) 1204, a precoder 1212, a power assignment controller 1213, and a plurality of antennas 1218, 1219, 1220, and 1221.

The mapper 1204 is responsible for mapping multiple codewords to multiple layers. The mapper 1204 is provided with a serial-to-parallel converter 1203 for mapping a codeword to at least two layers. In FIG. 10, the serial-to-parallel converter 1203 parallelizes an input codeword so as to be mapped to two separate layers.

The mapper 1004 maps the codeword 1 (CW#1) 1201 to the layer 1 (Layer#1) 1205 and maps the codeword 2 (CW#2) 1002 to the layer 2 (Layer#2) 1206 and the layer 3 (Layer#3) 1207.

The precoder 1212 is responsible for mapping the layers to the antennas. That is, the precoder 1212 maps the layer 1 (Layer#1) 1205 to the antenna 1 (Antenna#1) 1218 and the antenna 3 (Antenna#3) 1220, the layer 2 (Layer#2) 1205 to the antenna 2 (Antenna#2) 1219, and the layer 3 (Layer#3) 1207 to the antenna 4 (Antenna#4) 1221.

The power assignment controller 1213 multiplies the values (P1, P2, P3, and P4) 1208, 1209, 1210, and 1211 of the non-zero elements of the precoding matrix selected from the codebook of Table 8, 10, or 11 between the corresponding layers 1205, 1206, and 1207 and antennas 1218, 1219, 1220, and 1221 by means of multipliers 1214, 1215, 1216, and 1217 and equalizes the powers assigned to the antennas.

That is, P1 1208 is multiplied between the layer 1 (Layer#1) 1205 and the antenna 1 (Antenna#1) 1218 by means of the multiplier 1214, and P2 1209 is multiplied between the layer 1 (Layer#1) 1205 and the antenna 3 (Antenna#3) 1220 by means of the multiplier 1215, in the precoder 1212.

If the precoding matrix (9) is selected and if the codebook is expressed in the normalized form, P1 1208 and P2 1209 are 1/2. The codeword 2 (CW#2) 1202 is parallelized by the serial-to-parallel converter 1203 so as to be mapped to the layer 2 (Layer#2) 1206 and the layer 3 (Layer#3) 1207. The codeword 2 is mapped to antenna 3 (Antenna#2) 1219 via the layer 2 (Layer#2) 1206 and to the antenna 4 (Antenna#4) 1221 via the layer 3 (Layer#3) 1207, by the precoder 1012.

In the precoder 1212, P3 1210 is multiplied between the layer 2 (Layer#2) 1206 and the antenna 2 (Antenna#2) 1019 by means of the multiplier 1216, and P4 1211 is multiplied between the layer 3 (Layer#3) 1207 and the antenna 4 (Antenna#4) 1221 by means of the multiplier (1217).

If the codebook is expressed in the normalized form, P3 1210 and P4 1211 are 1/2.

Figure 11:
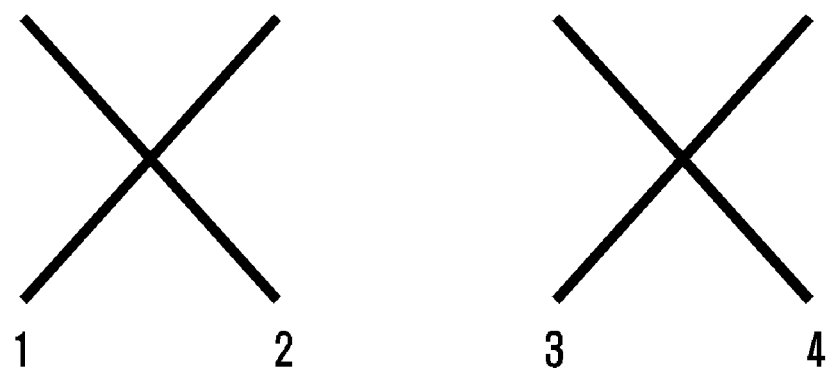
FIG. 11 is a diagram illustrating antenna configuration of the transmitter according to an embodiment of the present invention.

FIG. 11 is a diagram illustrating antenna configuration of the transmitter according to an embodiment of the present invention.

FIG. 11 shows an antenna configuration that can be used with the precoding matrices according to an embodiment of the present invention. As shown in FIG. 11, the antennas 1 and 3 are arranged in a same direction, and antennas 2 and 4 are arranged in another same direction. According to the directions of the antennas, antennas 1 and 3 have a spatial correlation, and antennas 2 and 4 have a special correlation.

Figure 12:
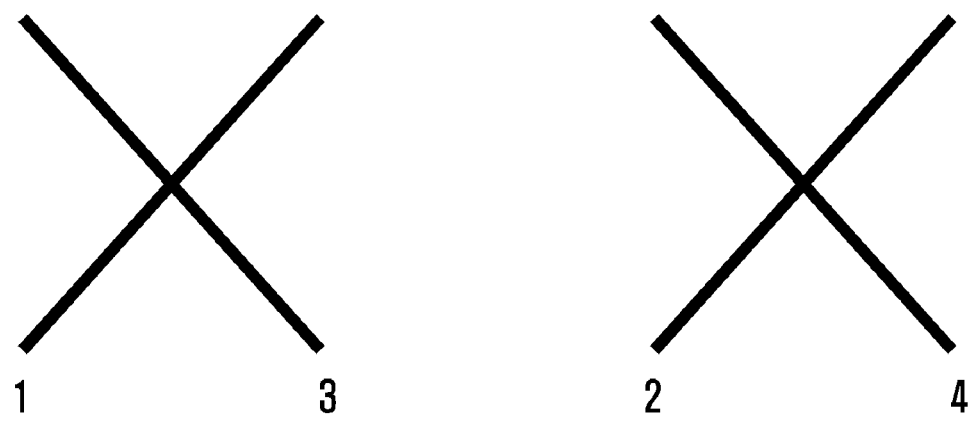
FIG. 12 is a diagram illustrating antenna configuration of the transmitter according to another embodiment of the present invention.

FIG. 12 is a diagram illustrating antenna configuration of the transmitter according to another embodiment of the present invention.

FIG. 12 shows an antenna configuration that can be used with the precoding matrices of Tables 27 to 31 according to an embodiment of the present invention. As shown in FIG. 12, antennas 1 and 2 are arranged in a same direction, and antennas 3 and 4 are arranged in another same direction. According to the directions of the antennas, antennas 1 and 2 have a spatial correlation, and antennas 3 and 4 have a spatial correlation.

Figure 13:
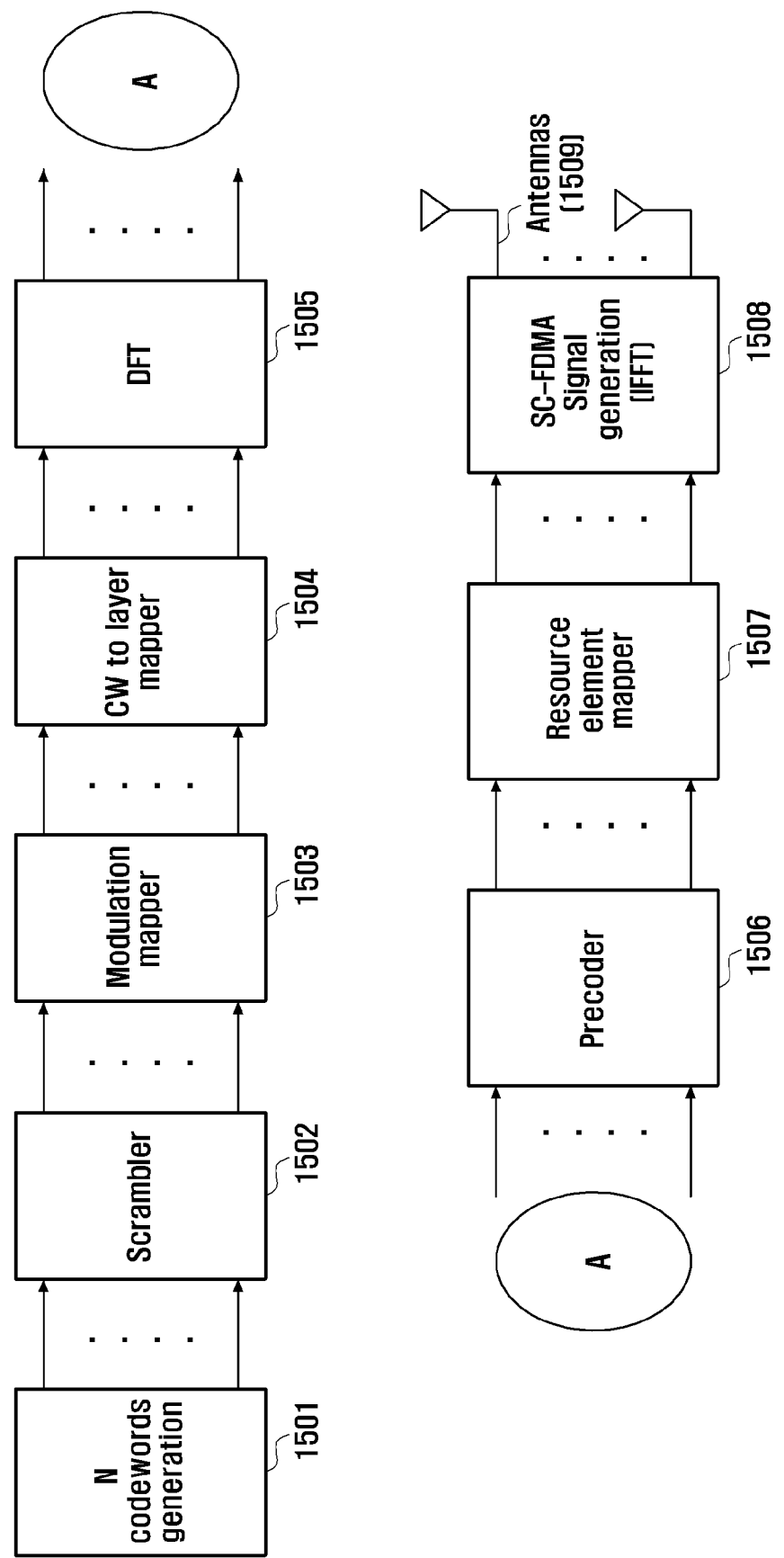
FIG. 13 is a block diagram illustrating a configuration of a transmitter of a user terminal according to an embodiment of the present invention.

FIG. 13 is a block diagram illustrating a configuration of a transmitter of a user terminal according to an embodiment of the present invention. A code generator 1501 generates N codewords. A scrambler 1502 performs scrambling on the encoded bit informations of each codeword for discriminating the codewords. A modulation mapper 1503 modulates the encoded bit informations into modulation symbols. A codeword-layer mapper 1504 maps the modulation symbols per codeword to corresponding layers. A Discrete Fourier Transformer (DFT) 1505 performs Discrete Fourier Transform on the output of the codeword-layer mapper. The precoder multiplies a precoding with the output of the DFT 105.

The modulation symbols per layer are mapped to antenna ports by means of the precoding matrix. That is, a resource element mapper 1507 maps the modulation symbols onto the corresponding resource. An SC-FDMA signal generator 1508 generates SC-FDMA signals through Inverse Fast Fourier Transform (IFFT). Antennas 1509 transmit the generated signals.

Figure 14:
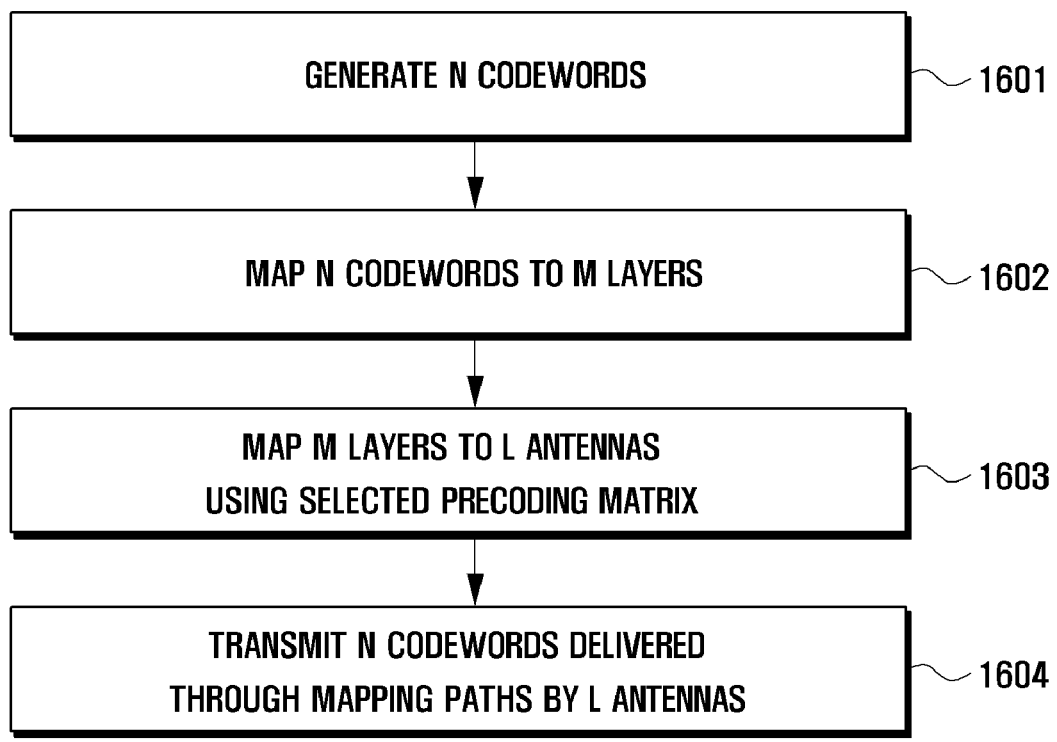
FIG. 14 is a flowchart illustrating a generalized procedure of the transmission method according to an embodiment of the present invention.

FIG. 14 is a flowchart illustrating a generalized procedure of the transmission method according to an exemplary embodiment of the present invention. In step 1601, the terminal first generates N codewords. Next, in step 1602, the terminal maps the N codewords to M layers. Here, the number of codewords (N) is less than or equal to the number of layers (M) (N≦M), and the transmit rank-M is determined by a base station and notified to the terminal. Also, in step 1603, the precoding matrix can be determined by the base station and notified to the terminal, the M layers are mapped to L antennas using the selected precoding matrix. Here, the number of layers (M) is less than or equal to the number of antennas (L) (M≦L). The N codewords mapped to the M layers are transmitted, in step 1604, through L antennas.

Figure 15:
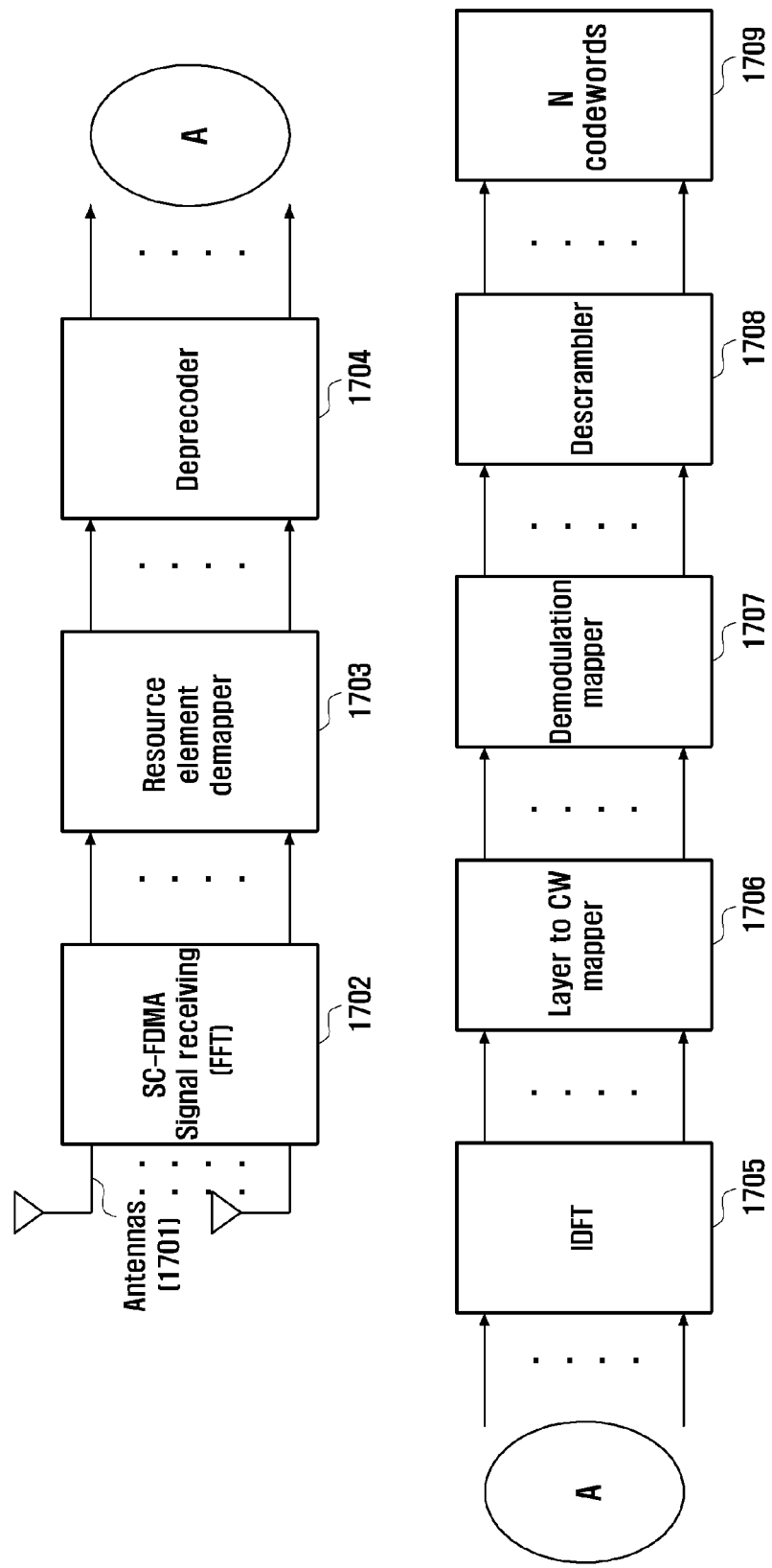
FIG. 15 is a block diagram illustrating configuration of the receiver according to an embodiment of the present invention.

FIG. 15 is a block diagram illustrating configuration of the receiver according to an embodiment of the present invention. The SC-FDMA signal is received through antennas 1701. A SC-FDMA signal receiver 1702 performs FFT on the received signal. A resource element demapper 1703 processes the signal received through the separate antennas 1701 to demap the resource. A deprecoder 1704 maps the modulation symbols as the output of the L antenna ports to corresponding layers. An Inverse Discrete Fourier Transformer (IDFT) 1705 performs IDFT on the symbol of each layer. A layer-codeword mapper 1706 maps the modulation symbols output from the respective layers per codeword. A demodulation mapper 1707 demodulates the modulation symbols per codeword. A descrambler 1708 performs descrambling on the demodulated modulation symbols. A codeword recovery unit 1709 recovers N codewords from the descrambled signals.

Figure 16:
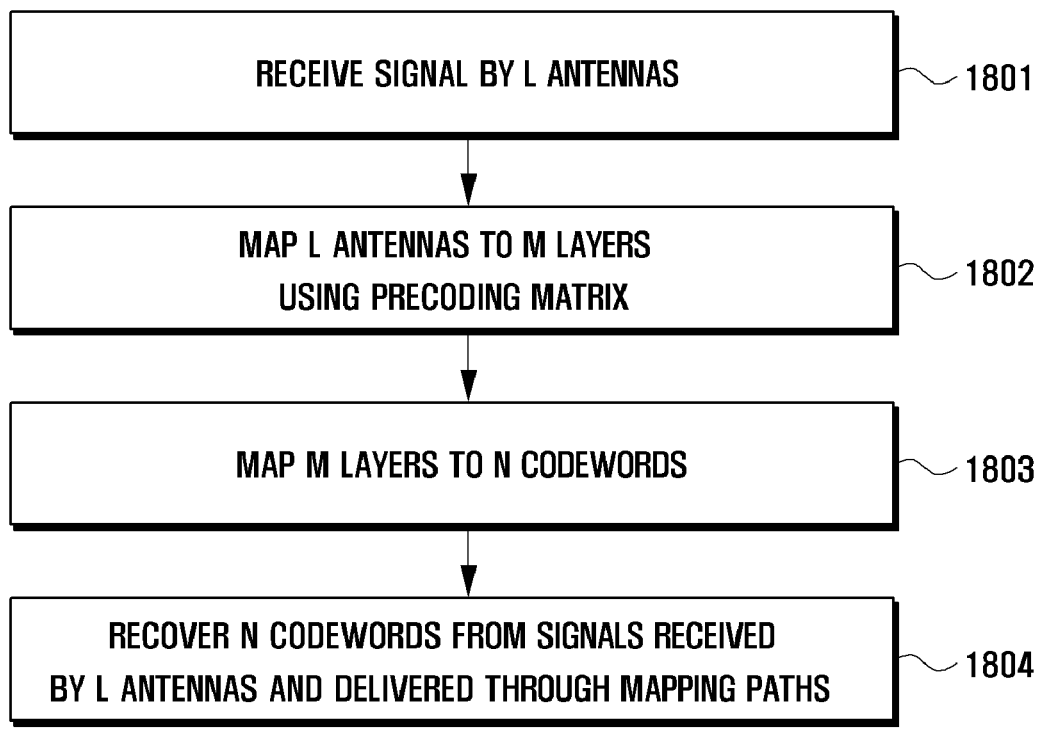
FIG. 16 is a flowchart illustrating a generalized procedure of the reception method according to an embodiment of the present invention.

FIG. 16 is a flowchart illustrating a generalized procedure of the reception method according to an embodiment of the present invention. In step 1801, a receiver receives a signal by means of L antennas. In step 1802, the receiver maps L antennas to M layers using a precoding matrix and then, in step 1803, maps the M layers to N codewords. By mapping the reception path of the signal from the L antennas to N codewords, it is possible to recover, in step 1804, the information of N codewords received through the antennas.

As described above, the communication method and apparatus of the present invention is capable of avoiding an increase in the PAPR in the rank-3 system by using the rank-3 precoding matrices designed not to increase PAPRs of the antennas. Also, the communication method and apparatus of the present invention uses the precoding matrices that, when using two codewords, map each codeword to two different antennas so as to undergo transmit diversity effects.

Also, the communication method and apparatus of the present invention allows implementing the rank-3 precoding matrices (codebook) with the matrices that do not increase the PAPRs of individual antennas, resulting in performance improvement across entire SNR region.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A transmission method using a codebook in a multiple-input multiple output system, comprising the steps of
mapping multiple codewords to multiple layers;
mapping the multiple layers to multiple antennas using a precoding matrix selected from a rank-3 codebook which is designed to map the codewords to different antennas; and
transmitting the codewords through paths formed by mapping the layers and the antennas,
wherein the precoding matrix of the rank-3 codebook is designed to equalize transmit power ratios between the antennas,
the precoding matrix of the rank-3 codebook produces a transmission power ratio among the layers of 2:1:1, and
the rank-3 codebook is:

$$\frac{1}{2}\begin{bmatrix}1&0&0\\1&0&0\\0&1&0\\0&0&1\end{bmatrix}, \frac{1}{2}\begin{bmatrix}1&0&0\\-1&0&0\\0&1&0\\0&0&1\end{bmatrix}, \frac{1}{2}\begin{bmatrix}1&0&0\\0&1&0\\0&0&1\\1&0&0\end{bmatrix}, \frac{1}{2}\begin{bmatrix}1&0&0\\0&1&0\\0&0&1\\-1&0&0\end{bmatrix}$$

$$\frac{1}{2}\begin{bmatrix}0&1&0\\0&0&1\\1&0&0\\1&0&0\end{bmatrix}, \frac{1}{2}\begin{bmatrix}0&1&0\\0&0&1\\1&0&0\\-1&0&0\end{bmatrix}, \frac{1}{2}\begin{bmatrix}0&1&0\\1&0&0\\1&0&0\\0&0&1\end{bmatrix}, \frac{1}{2}\begin{bmatrix}0&1&0\\1&0&0\\-1&0&0\\0&0&1\end{bmatrix}$$

$$\frac{1}{2}\begin{bmatrix}1&0&0\\0&1&0\\1&0&0\\0&0&1\end{bmatrix}, \frac{1}{2}\begin{bmatrix}1&0&0\\0&1&0\\-1&0&0\\0&0&1\end{bmatrix}, \frac{1}{2}\begin{bmatrix}0&1&0\\1&0&0\\0&0&1\\1&0&0\end{bmatrix}, \frac{1}{2}\begin{bmatrix}0&1&0\\1&0&0\\0&0&1\\-1&0&0\end{bmatrix}.$$

2. A transmission apparatus using a codebook in a multiple-input multiple-output system, comprising:
a codeword-layer mapper which maps multiple codewords to multiple layers;
a resource element mapper which maps the multiple layers to multiple antennas using a precoding matrix selected from a rank-3 codebook for mapping the codewords to different antennas; and
the multiple antennas which transmit the codewords transferred via the layers,
wherein the codewords are transmitted through paths formed by mapping the layers and the antennas, and the precoding matrix of the rank-3 codebook is designed to equalize transmit power ratios between the antenna,
the precoding matrix of the rank-3 codebook produces a transmission power ratio among the layers of 2:1:1, and
the rank-3 codebook is:

$$\frac{1}{2}\begin{bmatrix}1&0&0\\1&0&0\\0&1&0\\0&0&1\end{bmatrix}, \frac{1}{2}\begin{bmatrix}1&0&0\\-1&0&0\\0&1&0\\0&0&1\end{bmatrix}, \frac{1}{2}\begin{bmatrix}1&0&0\\0&1&0\\0&0&1\\1&0&0\end{bmatrix}, \frac{1}{2}\begin{bmatrix}1&0&0\\0&1&0\\0&0&1\\-1&0&0\end{bmatrix}$$

$$\frac{1}{2}\begin{bmatrix}0&1&0\\0&0&1\\1&0&0\\1&0&0\end{bmatrix}, \frac{1}{2}\begin{bmatrix}0&1&0\\0&0&1\\1&0&0\\-1&0&0\end{bmatrix}, \frac{1}{2}\begin{bmatrix}0&1&0\\1&0&0\\1&0&0\\0&0&1\end{bmatrix}, \frac{1}{2}\begin{bmatrix}0&1&0\\1&0&0\\-1&0&0\\0&0&1\end{bmatrix}$$

-continued $$\frac{1}{2}\begin{bmatrix}1&0&0\\0&1&0\\1&0&0\\0&0&1\end{bmatrix} \quad \frac{1}{2}\begin{bmatrix}1&0&0\\0&1&0\\-1&0&0\\0&0&1\end{bmatrix} \quad \frac{1}{2}\begin{bmatrix}0&1&0\\1&0&0\\0&0&1\\1&0&0\end{bmatrix} \quad \frac{1}{2}\begin{bmatrix}0&1&0\\1&0&0\\0&0&1\\-1&0&0\end{bmatrix}.$$

3. A reception method using a codebook in a multiple-input multiple-output system, comprising the steps of:
receiving signals through multiple antennas;
mapping multiple layers to the multiple antennas using a precoding matrix from a rank-3 codebook designed to map codewords to different antennas;
mapping multiple codewords to the multiple layers; and
recovering the codewords from the signals received through paths formed by mapping the layers and the antennas,
wherein the precoding matrix of the rank-3 codebook is designed to equalize transmit power ratios between the antennas,
wherein the precoding matrix of the rank-3 codebook produces a transmission power ratio among the layers of 2:1:1
the rank-3 codebook is:

$$\frac{1}{2}\begin{bmatrix}1&0&0\\1&0&0\\0&1&0\\0&0&1\end{bmatrix} \quad \frac{1}{2}\begin{bmatrix}1&0&0\\-1&0&0\\0&1&0\\0&0&1\end{bmatrix} \quad \frac{1}{2}\begin{bmatrix}1&0&0\\0&1&0\\0&0&1\\1&0&0\end{bmatrix} \quad \frac{1}{2}\begin{bmatrix}1&0&0\\0&1&0\\0&0&1\\-1&0&0\end{bmatrix}$$

$$\frac{1}{2}\begin{bmatrix}0&1&0\\0&0&1\\1&0&0\\1&0&0\end{bmatrix} \quad \frac{1}{2}\begin{bmatrix}0&1&0\\0&0&1\\1&0&0\\-1&0&0\end{bmatrix} \quad \frac{1}{2}\begin{bmatrix}0&1&0\\1&0&0\\1&0&0\\0&0&1\end{bmatrix} \quad \frac{1}{2}\begin{bmatrix}0&1&0\\1&0&0\\-1&0&0\\0&0&1\end{bmatrix}$$

$$\frac{1}{2}\begin{bmatrix}1&0&0\\0&1&0\\1&0&0\\0&0&1\end{bmatrix} \quad \frac{1}{2}\begin{bmatrix}1&0&0\\0&1&0\\-1&0&0\\0&0&1\end{bmatrix} \quad \frac{1}{2}\begin{bmatrix}0&1&0\\1&0&0\\0&0&1\\1&0&0\end{bmatrix} \quad \frac{1}{2}\begin{bmatrix}0&1&0\\1&0&0\\0&0&1\\-1&0&0\end{bmatrix}.$$

4. A reception apparatus using a codebook in a multiple-input multiple-output system, comprising:
a plurality of antennas which receive signals;
a deprecoder which maps multiple layers to multiple antennas using a precoding matrix selected from a rank-3 codebook designed to map codewords to different antennas;
a layer-codeword mapper which maps multiple codewords to the multiple layers; and
a codeword recovery unit which recovers the codewords from the signals received through paths formed by mapping the layers and the antennas,
wherein the precoding matrix of the rank-3 codebook is designed to equalize transmit power ratios between the antennas,
the precoding matrix of the rank-3 codebook produces a transmission power ratio among the layers of 2:1:1,
the rank-3 codebook is:

$$\frac{1}{2}\begin{bmatrix}1&0&0\\1&0&0\\0&1&0\\0&0&1\end{bmatrix} \quad \frac{1}{2}\begin{bmatrix}1&0&0\\-1&0&0\\0&1&0\\0&0&1\end{bmatrix} \quad \frac{1}{2}\begin{bmatrix}1&0&0\\0&1&0\\0&0&1\\1&0&0\end{bmatrix} \quad \frac{1}{2}\begin{bmatrix}1&0&0\\0&1&0\\0&0&1\\-1&0&0\end{bmatrix}$$

$$\frac{1}{2}\begin{bmatrix}0&1&0\\0&0&1\\1&0&0\\1&0&0\end{bmatrix} \quad \frac{1}{2}\begin{bmatrix}0&1&0\\0&0&1\\1&0&0\\-1&0&0\end{bmatrix} \quad \frac{1}{2}\begin{bmatrix}0&1&0\\1&0&0\\1&0&0\\0&0&1\end{bmatrix} \quad \frac{1}{2}\begin{bmatrix}0&1&0\\1&0&0\\-1&0&0\\0&0&1\end{bmatrix}$$

$$\frac{1}{2}\begin{bmatrix}1&0&0\\0&1&0\\1&0&0\\0&0&1\end{bmatrix} \quad \frac{1}{2}\begin{bmatrix}1&0&0\\0&1&0\\-1&0&0\\0&0&1\end{bmatrix} \quad \frac{1}{2}\begin{bmatrix}0&1&0\\1&0&0\\0&0&1\\1&0&0\end{bmatrix} \quad \frac{1}{2}\begin{bmatrix}0&1&0\\1&0&0\\0&0&1\\-1&0&0\end{bmatrix}.$$

\* \* \* \* \*